United States Patent
Prasad et al.

(10) Patent No.: US 9,906,340 B2
(45) Date of Patent: Feb. 27, 2018

(54) STANDARDS COMPLIANT COORDINATED MULTI-POINT SCHEDULING OVER LTE HETEROGENEOUS WIRELESS NETWORKS

(71) Applicant: NEC Laboratories America, Inc., Princeton, NJ (US)

(72) Inventors: Narayan Prasad, Willow Grove, PA (US); Sampath Rangarajan, Bridgewater, NJ (US); Yasushi Maruta, Tokyo (JP); Duong Pham, Mulgrave (AU); Arun Gurung, Mulgrave (AU); Caroline Liang, Surrey (GB); Patricia Wells, Surrey (GB); Robert Arnott, Surrey (GB)

(73) Assignee: NEC Corporation (JP)

( * ) Notice: Subject to any disclaimer, the term of this patent is extended or adjusted under 35 U.S.C. 154(b) by 133 days.

(21) Appl. No.: 15/015,333

(22) Filed: Feb. 4, 2016

(65) Prior Publication Data

US 2016/0233994 A1 Aug. 11, 2016

Related U.S. Application Data

(60) Provisional application No. 62/112,790, filed on Feb. 6, 2015, provisional application No. 62/278,673, filed on Jan. 14, 2016.

(51) Int. Cl.
*H04W 72/08* (2009.01)
*H04W 72/06* (2009.01)
(Continued)

(52) U.S. Cl.
CPC .......... *H04L 5/0035* (2013.01); *H04B 7/024* (2013.01); *H04B 7/0626* (2013.01); *H04L 5/006* (2013.01);
(Continued)

(58) Field of Classification Search
CPC .... H04B 7/024; H04B 7/0632; H04B 7/0626; H04B 7/0456; H04B 15/00; H04B 7/022;
(Continued)

(56) References Cited

U.S. PATENT DOCUMENTS

| | | | |
|---|---|---|---|
| 2012/0155366 A1* | 6/2012 | Zirwas | H04B 7/024 370/312 |
| 2014/0045510 A1* | 2/2014 | Yue | H04W 72/042 455/450 |
| 2015/0063222 A1* | 3/2015 | Wang | H04W 24/02 370/329 |

OTHER PUBLICATIONS

Clerckx, et al., "A Practical Cooperative Multicell MIMO-OFDMA Network Based on Rank Coordination", IEEE Transactions on Wireless Communications, Apr. 2013, pp. 1481-1491, vol. 12, No. 4.

(Continued)

*Primary Examiner* — Lester Kincaid
*Assistant Examiner* — Gary Lafontant
(74) *Attorney, Agent, or Firm* — Joseph Kolodka

(57) ABSTRACT

A method and transmitting device are provided for coordinated multi-point transmission scheduling by a transmitting device over one or more heterogeneous wireless networks that include a set of clusters. Each of the clusters has a set of transmission points for serving a set of user equipment devices. The method includes determining constraints imposed on any of the user equipment devices. The method further includes receiving channel state information feedback from the user equipment devices. The method also includes obtaining user weights and buffer sizes. The method additionally includes iteratively determining a weighted sum of user rates based on the constraints, the channel state information feedback, the user weights, and the buffer sizes. The iteratively determining step determines the weighted sum of user rates based on an initial weighted (Continued)

sum of user rates determined for the user equipment devices without the constraints.

20 Claims, 8 Drawing Sheets

(51) Int. Cl.
|  |  |
|---|---|
| *H04L 5/00* | (2006.01) |
| *H04W 24/02* | (2009.01) |
| *H04W 72/04* | (2009.01) |
| *H04B 7/024* | (2017.01) |
| *H04B 7/06* | (2006.01) |
| *H04W 84/04* | (2009.01) |
| *H04W 88/02* | (2009.01) |
| *H04W 88/08* | (2009.01) |

(52) U.S. Cl.
CPC .......... *H04L 5/0057* (2013.01); *H04L 5/0064* (2013.01); *H04W 24/02* (2013.01); *H04W 72/0406* (2013.01); *H04W 72/06* (2013.01); *H04W 72/082* (2013.01); *H04W 72/085* (2013.01); *H04W 84/042* (2013.01); *H04W 88/02* (2013.01); *H04W 88/08* (2013.01)

(58) Field of Classification Search
CPC .. H04B 7/0413; H04B 17/309; H04B 7/0452; H04B 7/0619; H04B 7/063; H04B 7/0634; H04L 5/0035; H04L 5/0032; H04L 5/00
USPC ......................................................... 455/452
See application file for complete search history.

(56) References Cited

OTHER PUBLICATIONS

Lee, et al., "Coordinated Multipoint Transmission and Reception in LTE-Advanced Systems", Technology Updates on LTE Advanced, IEEE Communications Magazine, Nov. 2012, pp. 44-50.

Sanjabi, et al., "Optimal Joint Base Station Assignment and Beamforming for Heterogeneous Networks", IEEE Transactions on Signal Processing, Apr. 2014, pp. 1950-1961, vol. 62, No. 8.

* cited by examiner

STANDARDS COMPLIANT COORDINATED MULTI-POINT SCHEDULING OVER LTE HETEROGENEOUS WIRELESS NETWORKS

RELATED APPLICATION INFORMATION

This application claims priority to provisional application Ser. No. 62/112,790 filed on Feb. 6, 2015, and provisional application Ser. No. 62/278,673 filed on Jan. 14, 2016, incorporated herein by reference in their respective entireties.

BACKGROUND

Technical Field

The present invention relates to wireless networks, and more particularly to standards compliant Coordinated Multi-Point (CoMP) scheduling over Long-Term Evolution (LTE) heterogeneous wireless networks.

Description of the Related Art

The prior approaches for coordinated multi-point scheduling either assume ideal conditions such as the availability of perfect channel state information or do not provide implementable methods to obtain channel state feedback from the users. Moreover, the suggested scheduling methods are not practical enough for implementation. Thus, there is a need for an improved approach for coordinated multi-point scheduling over HetNets.

SUMMARY

These and other drawbacks and disadvantages of the prior art are addressed by the present principles, which are directed to standards compliant Coordinated Multi-Point (CoMP) scheduling over Long-Term Evolution (LTE) heterogeneous wireless networks.

According to an aspect of the present principles, a method is provided for coordinated multi-point transmission scheduling by a transmitting device over one or more heterogeneous wireless networks that include a set of clusters. Each of the clusters has a set of transmission points for serving a set of user equipment devices. The method includes determining constraints imposed on any of the user equipment devices. The method further includes receiving channel state information feedback from the user equipment devices. The method also includes obtaining user weights and buffer sizes. The method additionally includes iteratively determining a weighted sum of user rates based on the constraints, the channel state information feedback, the user weights, and the buffer sizes. The iteratively determining step determines the weighted sum of user rates based on an initial weighted sum of user rates determined for the user equipment devices without the constraints.

According to another aspect of the present principles, a computer program product is provided for coordinated multi-point transmission scheduling by a transmitting device over one or more heterogeneous wireless networks that include a set of clusters. Each of the clusters has a set of transmission points for serving a set of user equipment devices. The computer program product includes a non-transitory computer readable storage medium having program instructions embodied therewith. The program instructions are executable by a computer to cause the computer to perform a method. The method includes determining constraints imposed on any of the user equipment devices. The method further includes receiving channel state information feedback from the user equipment devices. The method also includes obtaining user weights and buffer sizes. The method additionally includes iteratively determining a weighted sum of user rates based on the constraints, the channel state information feedback, the user weights, and the buffer sizes. The iteratively determining step determines the weighted sum of user rates based on an initial weighted sum of user rates determined for the user equipment devices without the constraints.

According to yet another aspect of the present principles, a transmitting device is provided for coordinated multi-point transmission scheduling over one or more heterogeneous wireless networks that include a set of clusters. Each of the clusters has a set of transmission points for serving a set of user equipment devices. The transmitting device includes a processor configured to determine constraints imposed on any of the user equipment devices. The processor is further configured to receive channel state information feedback from the user equipment devices. The processor is also configured to obtain user weights and buffer sizes. The processor is additionally configured to iteratively determine a weighted sum of user rates based on the constraints, the channel state information feedback, the user weights, and the buffer sizes. The weighted sum of user rates is based on an initial weighted sum of user rates determined for the user equipment devices without the constraints.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
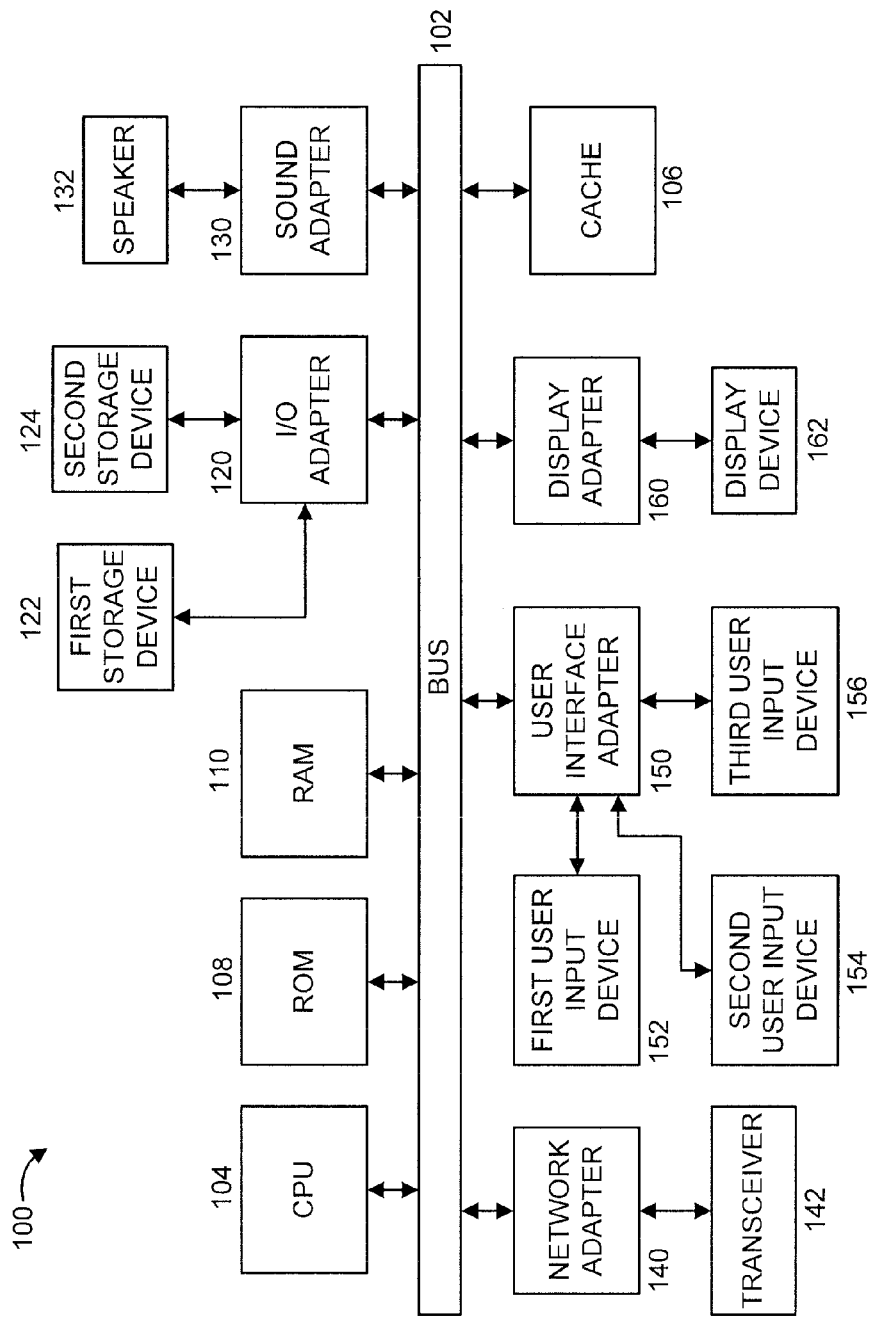
FIG. 1 is a block diagram illustrating an exemplary processing system 100 to which the present principles may be applied, according to an embodiment of the present principles.

The present principles are directed to standards compliant Coordinated Multi-Point (CoMP) scheduling over Long-Term Evolution (LTE) heterogeneous wireless networks (HetNets).

In an embodiment, the present principles provide a method for joint resource allocation (joint scheduling) in each HetNet cluster. In an embodiment, the present principles are fully compliant with the 3GPP LTE standard.

The present principles can be directed to transmission points (TPs) in a HetNet that are connected to each other by an ideal backhaul with low latency. Over such HetNets, schemes that strive to obtain all coordinated resource management decisions within the fine slot-level granularity (typically a millisecond) are suitable, since coordination (which involves exchange of messages and signaling over the backhaul) can be expeditiously performed over the ideal backhaul. The present principles are also readily applied to the so-called L2-CRAN architecture in which only a central node in a HetNet cluster can make resource allocation decisions and all other nodes simply follow the instructions given to them by the central node.

The present principles can be applied to a cluster of TPs that can include multiple high power macro TPs as well as several low power pico TPs, and presumed the use of frequency division duplex (FDD). Interference management over such a HetNet cluster is complicated due to the limited channel state information (CSI) available at the scheduler, the typically irregular topology, and the fact that there need not be one common dominant interferer for all pico TPs. The comprehensive resource allocation (management) scheme provided by the present principles can readily operate in such an environment.

In various embodiments, two distinct approaches are provided for obtaining CSI feedback from the users. These two approaches are referred to herein as class-A and class-B approaches, and are both fully standards compliant. The class-A approach obtains CSI feedback with a low overhead, whereas the class-B approach is relatively more robust towards feedback errors and is geared towards coordinated muting. Steps to further improve the quality of CSI (applicable for both classes) are also proposed.

Moreover, the present principles provide a user pre-selection algorithm that judiciously selects a smaller pool of users (from the active user set).

In an embodiment, we impose two constraints that are both satisfied by each of the two scheduling algorithms proposed herein.

One constraint is that each scheduled user can be assigned only one rank (which represents the number of data streams assigned to that scheduled user) and this constraint (referred to herein as the "per-user rank constraint") is mandatory as per the LTE-A standard. The other constraint (referred to herein as the "per-user serving Transmission Point constraint" or per-user serving TP constraint") requires that each scheduled user can receive data from only one TP across all the resource block groups (RBGs) on which it is scheduled in a subframe. The per-user serving TP constraint of allowing only one TP to serve a scheduled user precludes joint transmission, wherein a user can receive data from more than one TP on any RBG, as well as frequency selective dynamic point selection (DPS), wherein a user can receive data from different TPs on different RBGs. Our contention is that this is indeed a wise choice because for both these schemes ensuring a reliable channel estimation at the user end prior to demodulation are very challenging. The latter assertion holds since for both these schemes a quasi co-location indication that would allow a user to obtain reliable channel estimates by reusing some parameters that are estimated using dense cell-specific reference signals, cannot be correctly sent. Moreover, in the case of joint transmission, the available feedback is insufficient to exploit coherent combining gains A brief description will now be given of user pre-selection, in accordance with an embodiment of the present principles.

The user pre-selection accounts for the per-user serving TP constraint and the per-user rank constraint. The user pre-selection recognizes the fact that the control signaling for each scheduled user in a subframe must be sent by only its anchor TP (irrespective of the TP that serves data to it in that subframe). The user pre-selection allows for setting a user limit for each TP, which is the maximum number of users to which that TP must send control signaling information, thereby imposing control channel overhead constraints. The user pre-selection can also allow for setting a limit on the number of RBGs that can be assigned to one or more specified users.

A brief description will now be given of the proposed Class-A approach, in accordance with an embodiment of the present principles.

In an embodiment, the Class-A approach involves obtaining one channel state information (CSI) feedback from each user for each TP in that user's CoMP set. This CSI feedback is obtained by configuring one CSI process under which pilots are sent on a set of configured resource elements (REs) from the TP and interference is measured on another set of configured REs by the user, with the interference arising due to transmissions from only TPs outside the CoMP set.

A brief description will now be given of the proposed Class-B approach, in accordance with an embodiment of the present principles.

In an embodiment, the Class-B approach involves classifying users as CoMP users and non-CoMP users, wherein each user whose CoMP set has a cardinality greater than one is classified as a CoMP user, while the remaining users are classified as non-CoMP users.

The Class-B approach further involves obtaining a first CSI feedback from each user for each TP in that user's CoMP set. This first CSI feedback is obtained by configuring one CSI process under which pilots are sent on a set of configured resource elements (REs) from the TP and interference is measured on another set of configured REs by the user, with the interference arising due to transmissions from only TPs outside the CoMP set. In addition, The Class-B approach involves obtaining another second CSI feedback from each CoMP user, for each TP in that user's CoMP set. This second CSI feedback is obtained by configuring one CSI process under which pilots are sent on a set of configured resource elements (REs) from the TP and interference is measured on another set of configured REs by the user, with the interference arising due to transmissions from all TPs excluding the TP.

A brief description will now be given of injecting isotropic interference, in accordance with an embodiment of the present principles.

The injection of isotropic interference involve transmitting a signal on each resource element of an interference measurement resource, wherein the signal is randomly and independently generated using an identical distribution with the desired (scaled identity) covariance and where the scaling factor is controllable.

A brief description will now be given of a resource allocation (scheduling) approach, in accordance with an embodiment of the present principles.

The resource allocation approach includes a main stage followed by a post-processing stage.

The main stage can be initialized by a "hot-start" step in which a best scheduling decision is initially obtained by considering only users for which there are no coupling constraints. Such users are those that can be only served by their anchor TPs using one pre-determined rank. Consequently, this best scheduling decision can be obtained by considering each RBG separately. The output of the hot-start step is then further improved by the main stage by considering all other users for whom there are coupling constraints.

The output of the hot-start step is improved by the main stage in an iterative fashion, where in each iteration at-most one additional assignment of a user (to receive data from a TP with some rank) is made on each resource block group (RBG), while ensuring that the aforementioned two constraints are satisfied and that the weighted sum rate utility is improved.

The post-processing stage improves the weighted sum-rate utility by first fixing the rank and serving TP for all users based on the output of the main stage. The post-processing stage then considers each RBG separately and compares the weighted sum rate estimate of the output decision of the main stage for that RBG, with that corresponding to an alternate scheduling decision, and selects the one yielding the higher weighted sum rate. The alternate decision conforms to the fixed per-user ranks and serving TPs, and can be determined for each TP (on each RBG) separately.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
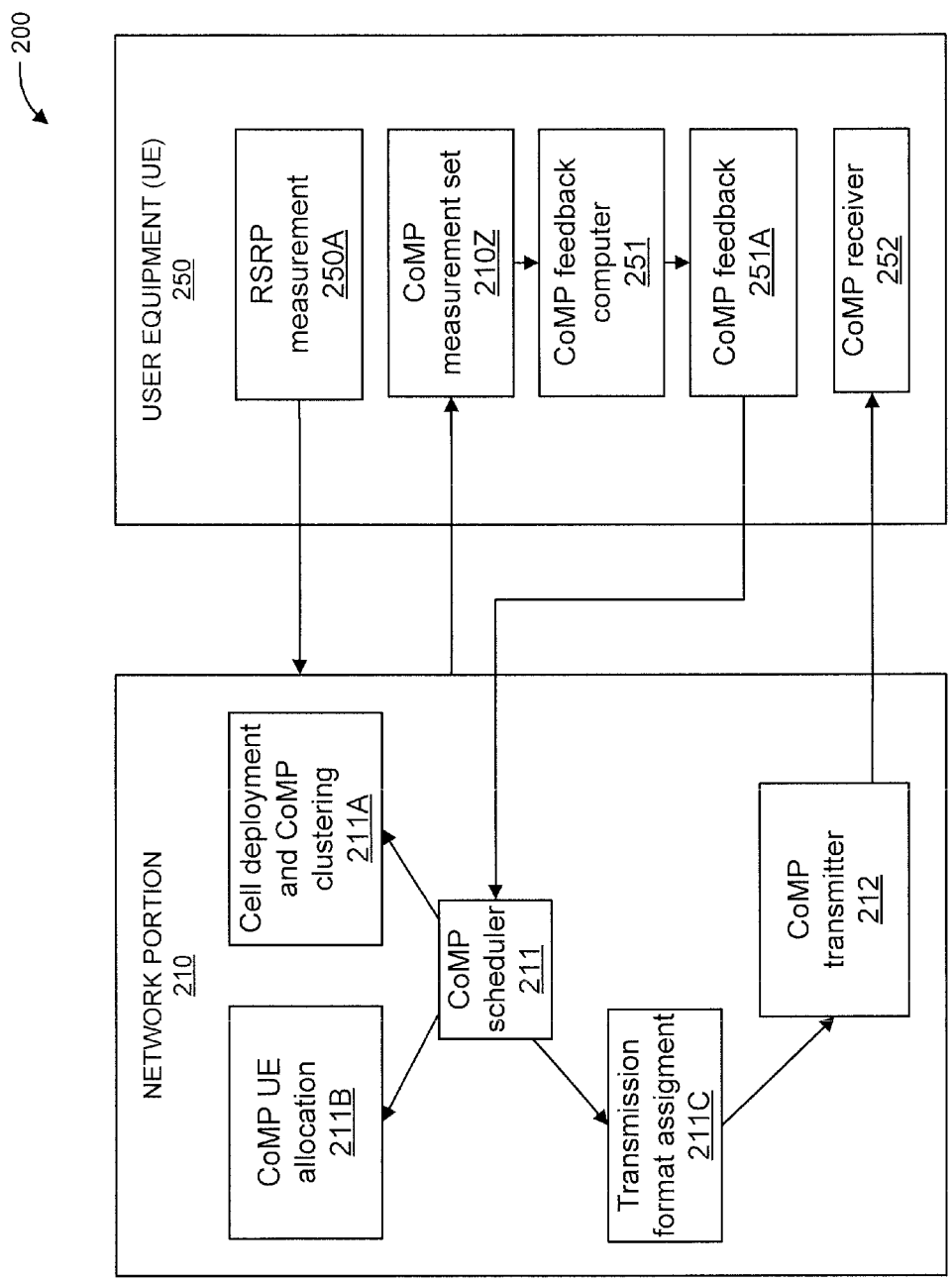
FIG. 2 shows an exemplary system 200 for Coordinated Multi-Point (CoMP) scheduling over Long-Term Evolution (LTE) heterogeneous wireless networks (HetNets), in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 4:
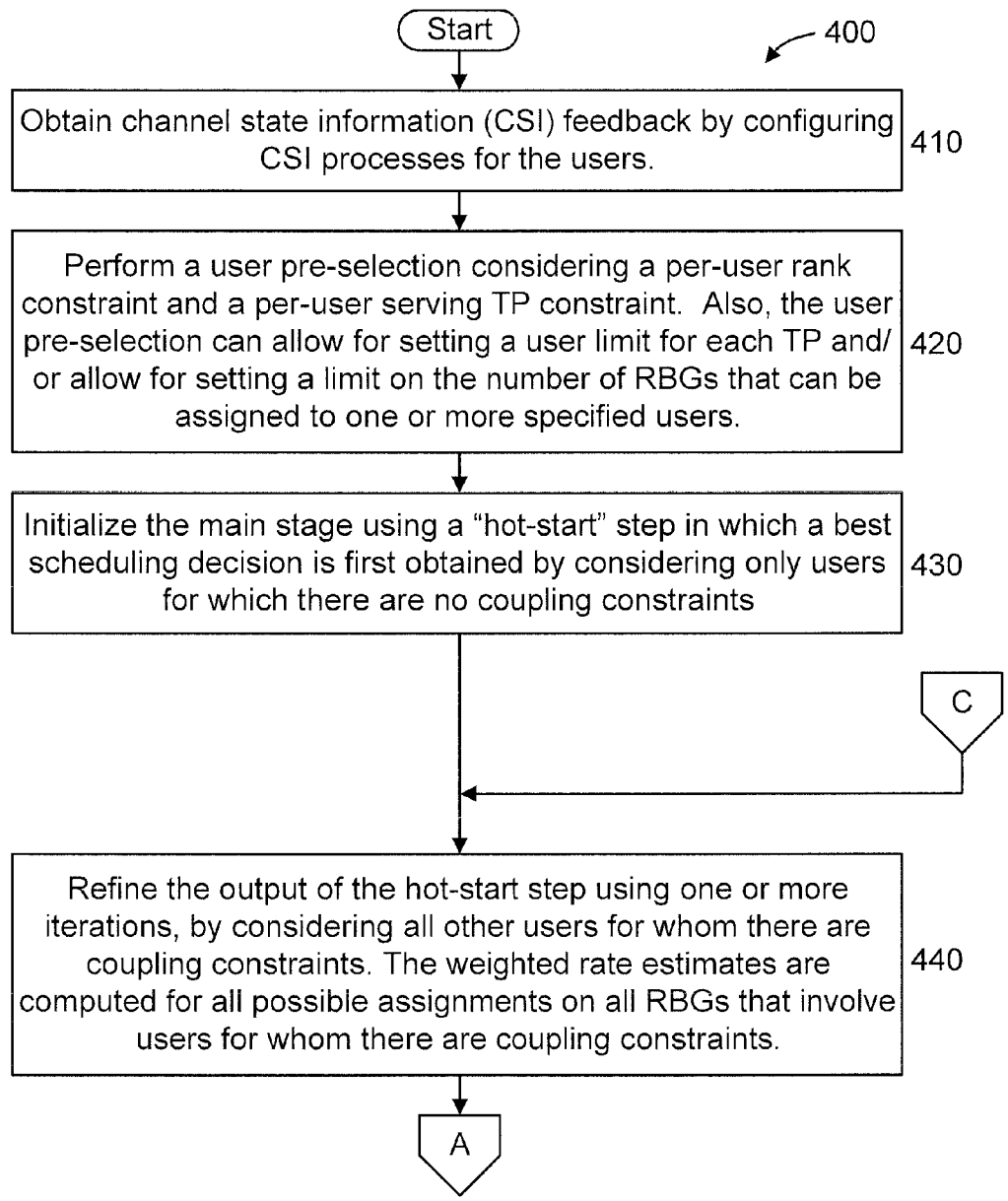
FIGS. 4-6 show an exemplary method 400 for Coordinated Multi-Point (CoMP) scheduling over Long-Term Evolution (LTE) heterogeneous wireless networks (HetNets), in accordance with an embodiment of the present principles.
Figure 5:
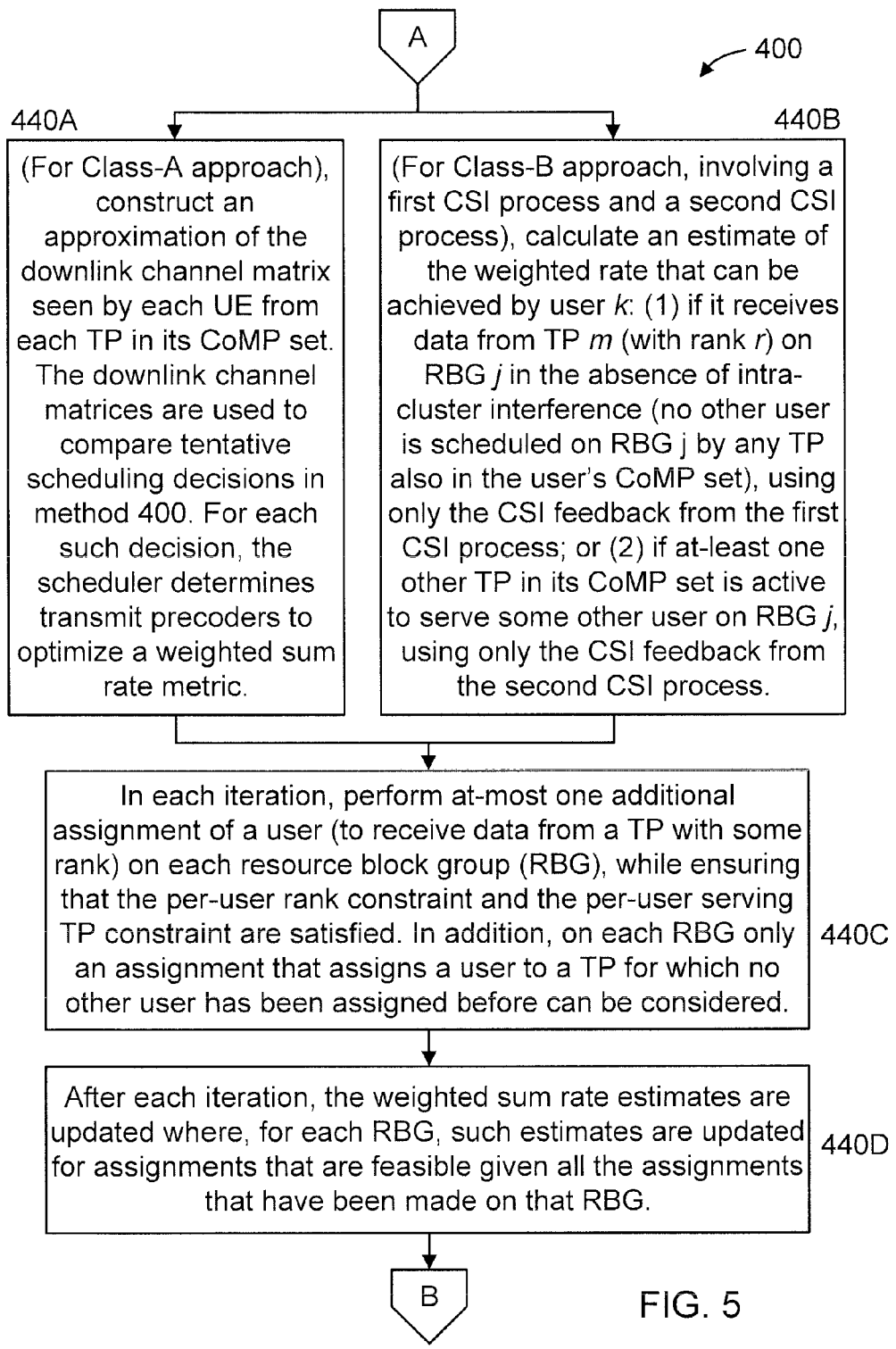
Figure 6:
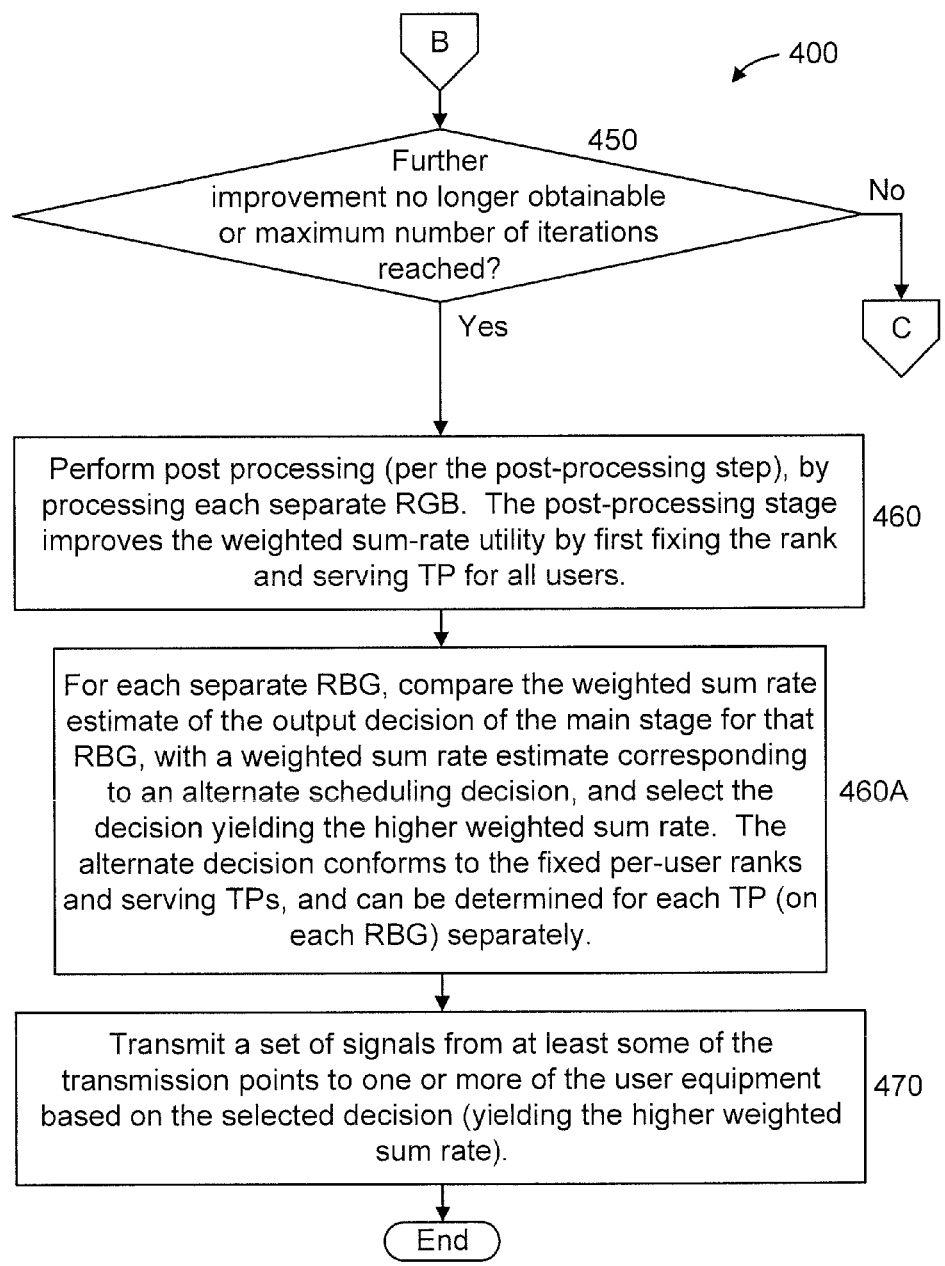
Figure 7:
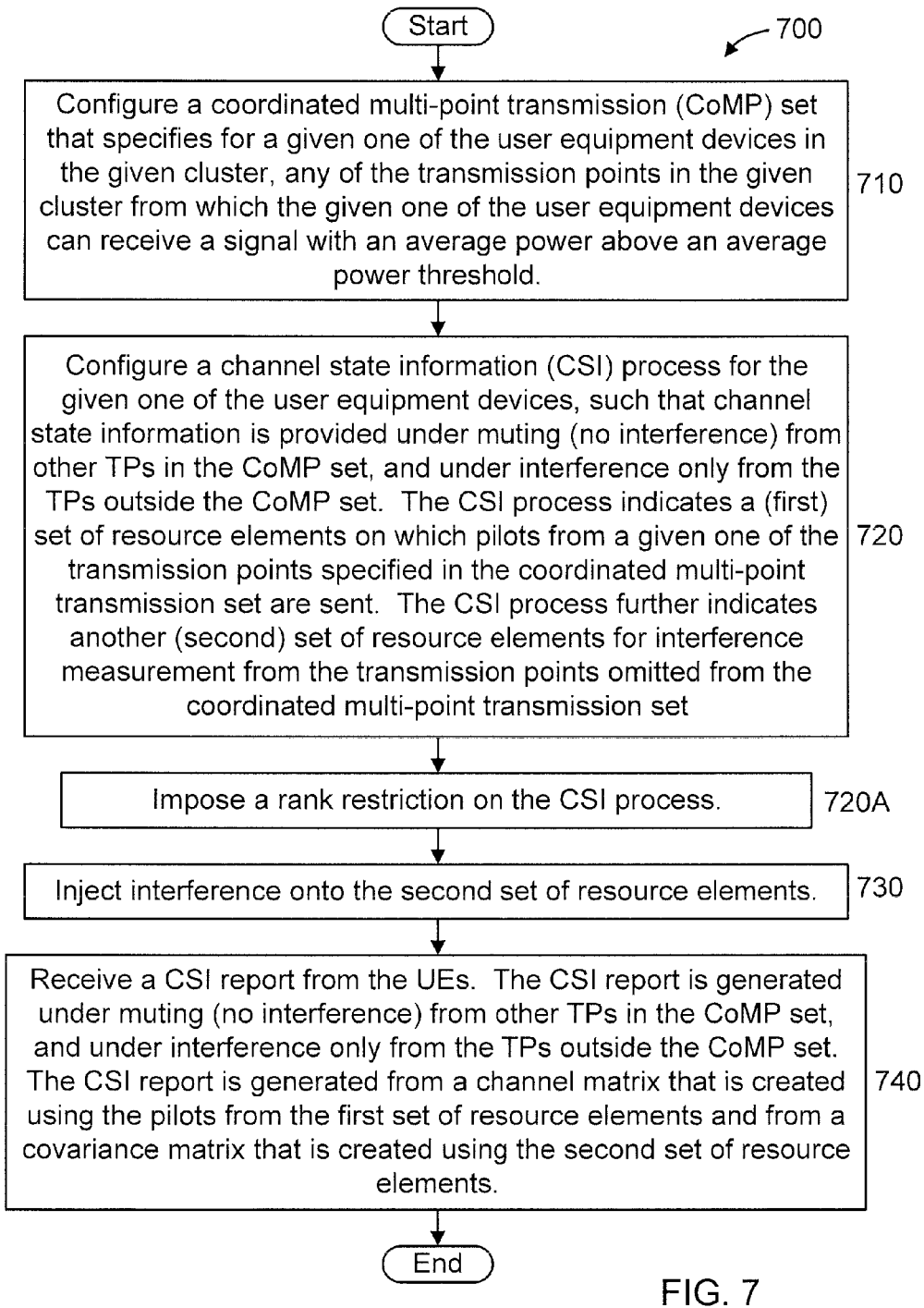
FIG. 7 shows an exemplary method 700 for obtaining channel state information (CSI) feedback from users in Long-Term Evolution (LTE) heterogeneous wireless networks (HetNets), in accordance with an embodiment of the present principles.
Figure 8:
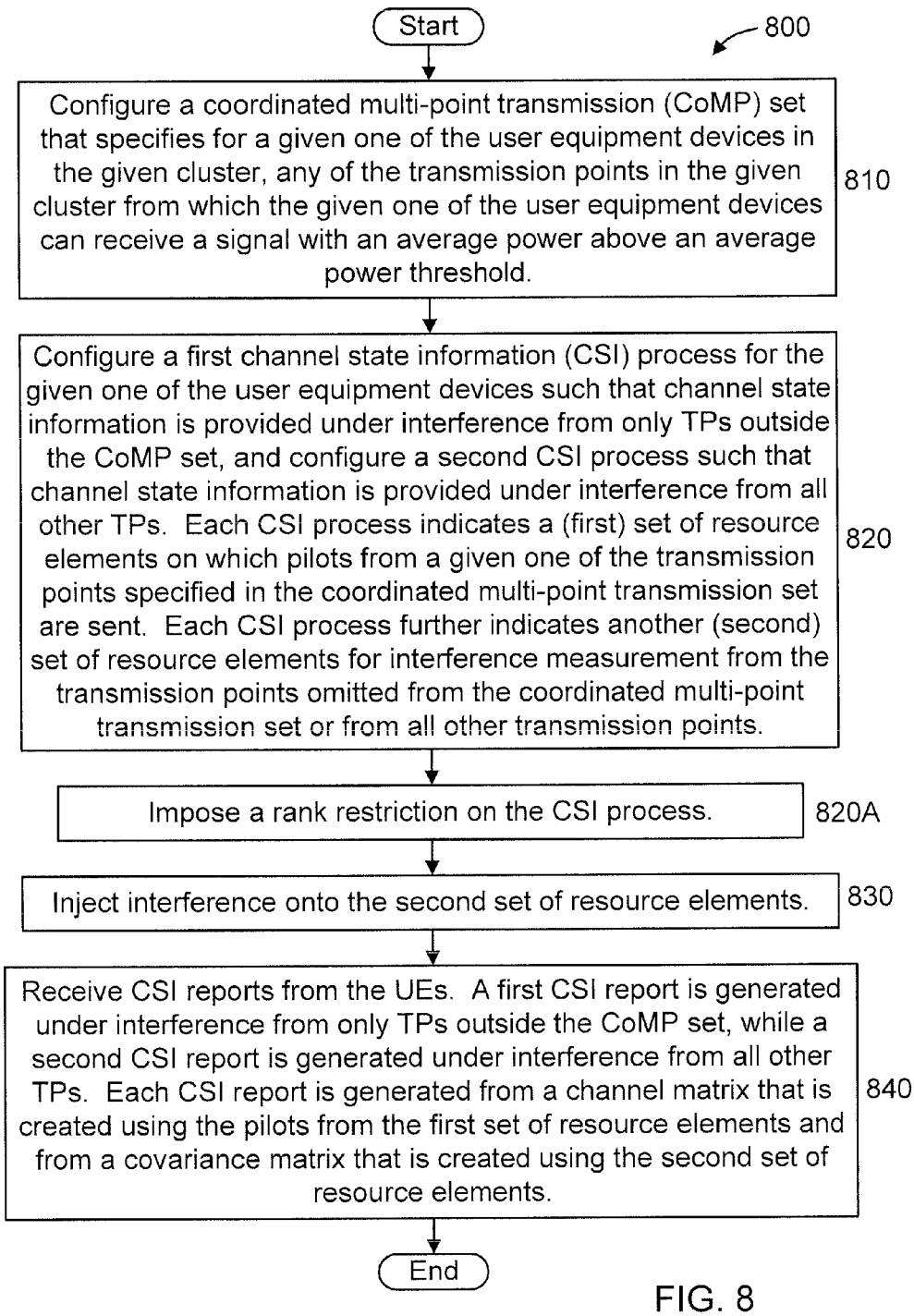
FIG. 8 shows another exemplary method 800 for obtaining channel state information (CSI) feedback from users in Long-Term Evolution (LTE) heterogeneous wireless networks (HetNets), in accordance with an embodiment of the present principles.

Further, it is to be appreciated that processing system 100 may perform at least part of the method described herein including, for example, at least part of method 400 of FIGS. 4-6 and/or at least part of method 700 of FIG. 7 and/or at least part of method 800 of FIG. 8. Similarly, part or all of system 200 may be used to perform at least part of method 400 of FIGS. 4-6 and/or at least part of method 700 of FIG. 7 and/or at least part of method 800 of FIG. 8.

While one or more of the following FIGS. 2-8 are described with respect to Long-Term Evolution (LTE) heterogeneous wireless networks (HetNets), the present principles can be applied to any type of HetNets. However, it is to be appreciated that the methods and systems described herein with respect to the present principles can be readily implemented in a manner that is compliant with the current LTE Standard (4G LTE).

FIG. 2 shows an exemplary system 200 for Coordinated Multi-Point (CoMP) scheduling over Long-Term Evolution (LTE) heterogeneous wireless networks (HetNets), in accordance with an embodiment of the present principles.

The system 200 involves a network portion 210. The network portion 210 corresponds to one or more HetNets. The network portion 210 interfaces with user equipment (UE) 250. In an embodiment, the network portion 210 is included in any of, e.g., a base station, a remote radio head, and so forth.

The network portion 210 includes a CoMP scheduler 211 for determining cell deployment and CoMP clustering 211A, CoMP UE allocation 211B, and transmission format assignment 211C. The CoMP scheduling can involve coordinated scheduling/coordinated beamforming (CS/CB), dynamic point selection (DPS). The network portion 210 further includes a CoMP transmitter 212 for performing CoMP transmissions.

The UE 250 provides RSRP measurements 250A to the network portion 210. The UE 250 receives a CoMP measurement set 210Z from the network portion 210. The UE 250 includes a CoMP feedback computer 251 for computing CoMP feedback 251A (e.g., using one of Class-A or Class-B CSI feedback methods, as shown in FIGS. 7 and 8, respectively). The CoMP feedback computer 251 provides the CoMP feedback 251A to the CoMP scheduler 211. The CoMP feedback 251A can include, for example, signal to interference plus noise ratio measurement, SINR (CQI), precoder (PMI), rank (RI) computations, or channel state information (CSI) which can include processed forms of PMI, CQI, RI. The UE 250 further includes a CoMP receiver 252 for receiving CoMP transmissions from the network portion 210.

Of course, the base portion 210 further includes a receiver (not shown) and the UE 250 further includes a transmitter (not shown).

In an embodiment, the CoMP scheduler 211 and the CoMP feedback computer 251 are each hardware-based and processor enabled. In an embodiment, each of them can be formed and/or otherwise implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth.

Figure 3:
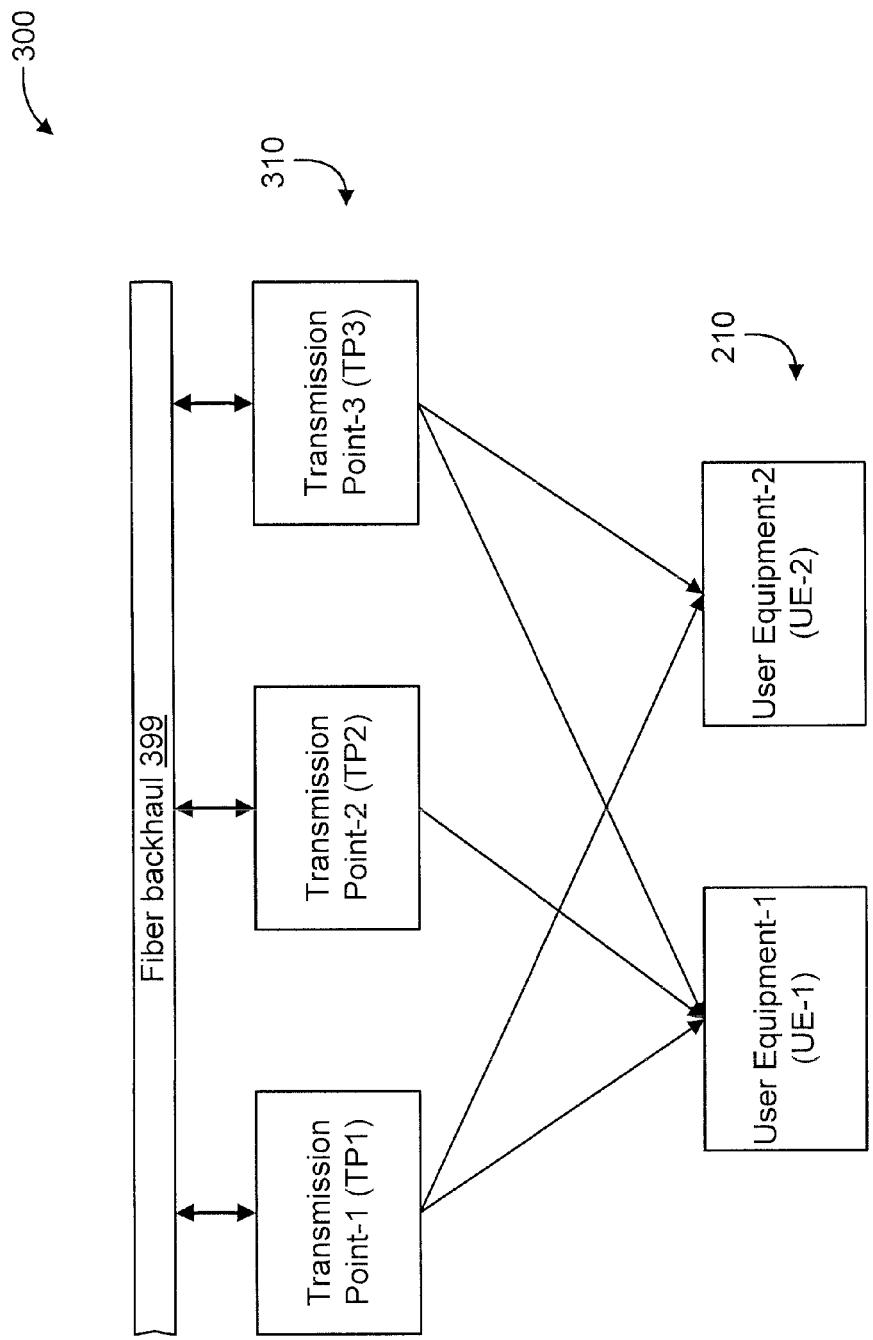
FIG. 3 shown an exemplary environment 300 to which the present principles can be applied, in accordance with an embodiment of the present principles.

FIG. 3 shown an exemplary environment 300 to which the present principles can be applied, in accordance with an embodiment of the present principles.

The environment 300 includes a set of transmission points 310 (TP-1 through TP-3), and a set of user equipment (UE) 320 (UE1 and UE2). The environment 300 operates with respect to a set of resource block groups (RBGs) (RBG-1 through RBG-N) and a set of ranks (rank-1 through rank-j).

The environment 300 can correspond to the downlink in a HetNet with universal frequency reuse. The TPs 310 are connected via a fiber backhaul 399, and can simultaneously transmit on the RBGs during each scheduling interval (each subframe) in order to serve a pool of K active users. Each RBG includes a fixed number of resource elements (REs). Each RBG spans the duration of a subframe and is a slice of the available bandwidth. For the purposes of the present principles, an RBG represents the minimum unit that can be assigned to any user in each subframe. Each of the TPS 310 as well each UE 320 can be equipped with multiple antennas.

The environment 300 operates using transmit ranks. A rank is the number of data symbol streams transmitted on each resource element (RE) in a given resource block group (RBG) and is referred to herein as the "rank" assigned to the intended user. The concept of rank is described in further detail herein.

FIGS. 4-5 show an exemplary method 400 for Coordinated Multi-Point (CoMP) scheduling over Long-Term Evolution (LTE) heterogeneous wireless networks (HetNets), in accordance with an embodiment of the present principles. Method 400 can be considered to include a main stage and a post-processing stage. Moreover, in an embodiment, the main stage can involve nested loops that, in turn, involve an inner loop and an outer loop. At the start of each outer loop, weighted sum rate estimates are computed for all possible feasible assignments of users on resource block groups (RBGs) to receive data from TPs with some ranks, where such assignments involve users that have not been selected so far and where the TPs have not already been assigned to other users on those RBGs in previous (outer) iterations. Then, the inner loop determines at-most one additional feasible assignment of a user (to receive data from a TP with some rank) on each RBG based on the estimated weighted sum rates.

At step 410, obtain channel state information (CSI) feedback by configuring CSI processes for the users. The CSI feedback can obtained using the Class-A (see, e.g., method 700 of FIG. 7) approach or the Class-B approach (see, e.g., method 800 of FIG. 8).

At step 420, perform a user pre-selection considering a per-user rank constraint and a per-user serving TP constraint. The per-user rank constraint constrains each scheduled user to be assigned only one rank (which represents the number of data streams assigned to that scheduled user). The per-user serving TP constraint constrains each scheduled user to receive data from only one TP across all the resource block groups (RBGs) on which it is scheduled in a subframe. Also, the user pre-selection can allow for setting a user limit for each TP, which is the maximum number of users to which that TP must send control signaling information, thereby imposing control channel overhead constraints. Additionally, the user pre-selection can allow for setting a limit on the number of RBGs that can be assigned to one or more specified users. The main stage considers only the preselected users instead of all the active users. Further, in an embodiment, the main stage can consider only the set of RBGs assigned to the preselected users instead of all the RBGs.

At step 430, initialize the main stage of method 400 using a "hot-start" step in which a best scheduling decision is first obtained by considering only users for which there are no coupling constraints. Such users are those that can be only served by their anchor TPs using one pre-determined rank. Consequently, this best scheduling decision can be obtained by considering each RBG separately. The output of the hot-start step is then further improved by the main stage.

At step 440, refine the output of the hot-start step using one or more iterations, by considering all other users for whom there are coupling constraints. The weighted rate estimates are computed for all possible assignments on all RBGs that involve users for whom there are coupling constraints. For each RBG, these estimates are computed assuming no other assignments on that RBG.

In an embodiment, step 440 can include one or both of steps 440A and 440B and includes steps 440C and 440D. Which of steps 440A and 440B are used depends upon whether the Class-A approach or the Class-B approach is to be used to obtain CSI feedback.

At step 440A (corresponding to the Class-A approach), construct an approximation of the downlink channel matrix seen by each UE from each TP in its CoMP set. The downlink channel matrices are used to compare tentative scheduling decisions in method 400. For each such decision, the scheduler determines transmit precoders to optimize a weighted sum rate metric.

At step 440B (corresponding to the Class-B approach), calculate a weighted sum estimate directly from the CSI feedback. We note that the Class-B approach provides CSI feedback using a first CSI process and a second CSI process. An estimate is calculated of the weighted rate that can be achieved by user k if it receives data from TP m (with rank r) on RBG j in the absence of intra-cluster interference (no other user is scheduled on RBG j by any TP also in the user's CoMP set), using only the CSI feedback from the first CSI process. Alternatively, an estimate is calculated of the weighted rate that can be achieved by user k if it receives data from TP m, if at-least one other TP in its CoMP set is active to serve some other user on RBG j, using only the CSI feedback from the second CSI process (configured for user k and TP m).

At step 440C, in each iteration, perform at-most one additional assignment of a user (to receive data from a TP with some rank) on each resource block group (RBG), while ensuring that the aforementioned two constraints (namely, the per-user rank constraint and the per-user serving TP constraint) are satisfied. In addition, on each RBG only an assignment that assigns a user to a TP for which no other user has been assigned before can be considered.

At step 440D, after each iteration, the weighted sum rate estimates are updated where, for each RBG, such estimates are updated for assignments that are feasible given all the assignments that have been made on that RBG.

At step 450, it is determined whether any further improvement of the estimates can no longer be obtained or if a predetermined maximum number of iterations have been reached. If so, then the method proceeds to step 460. Otherwise, the method returns to step 440.

At step 460, perform post processing (per the post-processing step), by processing each separate RGB. The post-processing stage improves the weighted sum-rate utility by first fixing the rank and serving TP for all users.

In an embodiment, step 460 includes step 460A.

At step 460A, for each separate RBG, compare the weighted sum rate estimate of the output decision of the main stage for that RBG, with a weighted sum rate estimate corresponding to an alternate scheduling decision, and select the decision yielding the higher weighted sum rate. The alternate decision conforms to the fixed per-user ranks and serving TPs, and can be determined for each TP (on each RBG) separately.

At step 470, transmit a set of signals from at least some of the transmission points to one or more of the user equipment based on the selected decision (yielding the higher weighted sum rate).

FIG. 7 shows an exemplary method 700 for obtaining channel state information (CSI) feedback from users in Long-Term Evolution (LTE) heterogeneous wireless networks (HetNets), in accordance with an embodiment of the present principles. Method 700 is also referred to herein as the Class-A approach. For the sake of clarity and illustration, method 700 is described with respect to one CSI process configured for a given UE. However, it is to be appreciated that more than one CSI process can be configured for each UE. It is to be further appreciated that each UE is assigned a coordinated multi-point transmission (CoMP) set.

At step 710, configure a coordinated multi-point transmission (CoMP) set that specifies for a given one of the user equipment devices in the given cluster, any of the transmission points in the given cluster from which the given one of the user equipment devices can receive a signal with an average power above an average power threshold.

At step 720, configure a channel state information (CSI) process for the given one of the user equipment devices, such that channel state information is provided under muting (no interference) from other TPs in the CoMP set, and under interference only from the TPs outside the CoMP set. The CSI process indicates a (first) set of resource elements on which pilots from a given one of the transmission points specified in the coordinated multi-point transmission (CoMP) set are sent. The CSI process further indicates another (second) set of resource elements for interference measurement from the transmission points omitted from the coordinated multi-point transmission set.

In an embodiment, step 720 includes step 720A.

At step 720A, impose a rank restriction on the CSI process.

At step 730, inject interference onto the second set of resource elements.

At step 740, receive a CSI report from the UEs. The CSI report is generated under muting (no interference) from other TPs in the CoMP set, and under interference only from the TPs outside the CoMP set. The CSI report is generated from a channel matrix that is created using the pilots from the first set of resource elements and from a covariance matrix that is created using the second set of resource elements.

FIG. 8 shows another exemplary method 800 for obtaining channel state information (CSI) feedback from users in Long-Term Evolution (LTE) heterogeneous wireless networks (HetNets), in accordance with an embodiment of the present principles. Method 800 is also referred to herein as the Class-B approach. For the sake of clarity and illustration, method 800 is described with respect to up to two CSI processes configured for a given UE. However, it is to be appreciated that more than two CSI processes can be configured for each UE. It is to be further appreciated that each UE is assigned a coordinated multi-point transmission (CoMP) set.

At step 810, configure a coordinated multi-point transmission (CoMP) set that specifies for a given one of the user equipment devices in the given cluster, any of the transmission points in the given cluster from which the given one of the user equipment devices can receive a signal with an average power above an average power threshold.

At step 820, configure a first channel state information (CSI) process for the given one of the user equipment devices such that channel state information is provided under interference from only TPs outside the CoMP set, and configure a second CSI process such that channel state information is provided under interference from all other TPs. Each CSI process indicates a (first) set of resource elements on which pilots from a given one of the transmission points specified in the coordinated multi-point transmission set are sent. Each CSI process further indicates another (second) set of resource elements for interference measurement from the transmission points omitted from the coordinated multi-point transmission set or from all other transmission points.

In an embodiment, step 820 includes step 820A.

At step 820A, impose a rank restriction on the CSI process.

At step 830, inject interference onto the second set of resource elements.

At step 840, receive CSI reports from the UEs. A first CSI report is generated under interference from only TPs outside the CoMP set, while a second CSI report is generated under interference from all other TPs. Each CSI report is generated from a channel matrix that is created using the pilots from the first set of resource elements and from a covariance matrix that is created using the second set of resource elements.

A brief description will now be given of the present principles and the environment in which they are utilized, in accordance with an embodiment of the present principles.

Cell splitting is the strategy that all network operators have chosen to meet the anticipated explosive growth in cellular data traffic. Under this strategy, in each cell as opposed to the conventional deployment of a single macro base station, multiple transmission points (TPs) are deployed. While each such TP can be a high power macro enhanced base-station (also known as an "eNB"), it is much more likely to be a low-power remote radio head (RRH) or a pico node of limited capabilities. The resulting networks formed by such disparate TPs are referred to as heterogeneous networks (also known as "HetNets") and indeed, a vast majority of next generation wireless networks will be HetNets that conform to the 3GPP LTE standard.

The "baseline" scheme for resource allocation in such HetNets is one where each user independently associates to the TP from which it receives the strongest average signal power. Each TP then performs dynamic scheduling at a fine subframe level time scale (e.g., every millisecond in LTE networks) over the pool of users that have associated to it, without coordinating with any other TP. Over many realistic network topologies, this simple baseline scheme itself captures most of the average spectral efficiency (SE) gains promised by cell splitting. Indeed, simulation results obtained as part of the LTE Release 11 standardization suggest that the potential benefit of more sophisticated coordinated resource allocation schemes is mainly to achieve significant gains in the 5-percentile SE, while retaining the average SE gains of the baseline. To facilitate implementation of such coordinated resource allocation schemes, the favored architecture is one where the set of TPs is partitioned into multiple clusters. Each cluster represents a basic coordination unit that includes multiple TPs and that is tasked with serving a set of users. Furthermore, each user can be associated with only one cluster and the association of users to clusters needs to be determined at a much coarser time-scale (once every hundred or more milliseconds). In the scenarios that were considered during downlink CoMP standardization in LTE Release 11, the TPs within each cluster were assumed to be connected via a reliable ultra-low latency backhaul such as optical fiber. Moreover, the TPs in each cluster were assumed to rely on directions from a central scheduler. These scenarios consequently are ideal for using centralized algorithms for coordinated resource allocation.

In an embodiment, the present principles are directed to subframe level coordination within each cluster. Since clustering and user association happen on time scales which are orders of magnitude coarser, we assume them to be given and fixed.

The present principles are based on an assessment of the gains that can be achieved over real HetNets via resource allocation schemes that fully adhere to the LTE standard. A significant fraction of these HetNets will use the FDD mode. Further, most deployments of pico nodes (or small cells) in the foreseeable future will be ones where those nodes are equipped with 2 transmit antennas. Consequently, the major challenges that need to be addressed in order to achieve the possible CoMP gains, are those posed by quantized and delayed channel state information (CSI) feedback from the users (which must also be obtained in a standards compliant manner) and limited scope for precoding or beamforming.

In an embodiment, a resource allocation problem is formulated that is tailored towards CoMP transmission schemes that provide robustness against CSI errors, and which accommodates important mandatory constraints pertaining to the choice of transmission parameters. Two approaches are proposed for obtaining and utilizing CSI feedback from the users that are both fully standards compliant. The other main challenge that needs to be addressed is the need for very low complexity resource allocation algorithms that can be implemented in the fine time-scale of interest. To meet this last challenge, a low-complexity resource allocation algorithm is systematically developed by first ascertaining the hardness of the problem at hand and then adopting an iterative approach, wherein each iteration involves solving a sub-problem on submodular set-function maximization. System evaluations of the algorithm provided herein and proposed approaches to obtain and exploit feedback, over a HetNet comprising of several hundred TPs serving a few thousand users, reveal several important insights, such as the following: utilizing ACK/NACK feedback from the users is essential; controlling the interference estimates employed by the users to determine their CSI reports is essential; the feedback approach that is geared towards coordinated muting yields the best results; and exploiting a rank restriction feature is beneficial. With these insights in hand, we have demonstrated that significant CoMP gains over the baseline scheme, can indeed be realized in realistic HetNets.

A description will now be given of a system model to which the present principles can be applied, in accordance with an embodiment of the present principles.

Consider the downlink in a HetNet with universal frequency reuse and focus on a cluster of M TPs that are synchronized and connected via a fiber backhaul. These TPs can simultaneously transmit on N orthogonal resource block groups (RBGs) during each scheduling interval (each subframe) in order to serve a pool of K active users. Each RBG includes a fixed number of resource elements (REs). Each RGB spans the duration of a subframe and is a slice of the available bandwidth. For our purposes, an RBG represents the minimum unit that can be assigned to any user in each subframe. Each TP as well as each user can be equipped with multiple antennas. We let U denote the set of K users, M denote the set of M TPs and N denote the set of N RBGs. Then, the signal received by user k on the $l^{th}$ RE of RBG j in a subframe can be modeled as follows:

$$y_{j,k,l} = \Sigma_{m=1}^{M} H_{j,k,m} t_{j,m,l} + V_{j,k,l} \quad (1)$$

where, for notational convenience, we have dropped the subframe index. The matrix $H_{j,k,m}$ models the MIMO channel between TP m and user k on RBG j and is constant over all REs within that RBG. This channel matrix includes small-scale fading, large-scale fading and path attenuation. The vector $V_{j,k,l}$ captures the additive noise as well as the out-of-cluster interference, while $t_{j,m,l}$ denotes the signal vector transmitted by TP m on the $l^{th}$ RE in RBG j. It is to be noted that the model in Equation (1) holds for the orthogonal frequency-division-multiplexing-based downlink if the maximum signal propagation delay. Considering the latter signal vector, we impose a restriction that each TP is allowed to serve at-most one user on each RBG. This restriction is imposed here to maintain readability but it is commonly used as a safeguard against inaccurate (quantized) feedback from the users. Then, we can express $t_{j,m,l}$ as follows:

$$t_{j,m,l} = W_{j,m} b_{j,m,l} \quad (2)$$

where $b_{j,m,l}$ is the complex-valued symbol vector transmitted by TP m that is intended for some user and satisfies $E[b_{j,m,l} b_{j,m,l}^\dagger] = I$. The transmit precoding matrix $W_{j,m}$ is constrained (as per LTE) to remain fixed across all REs in RBG j and also satisfy a power constraint ($tr(W_{j,m}^\dagger W_{j,m}) \leq P_m$ for some given $P_m > 0$). The row (column) dimension of $b_{j,m,l}$ ($W_{j,m}$) is the number of data symbol streams transmitted on each RE in RBG j and is referred to as the "rank" assigned to the intended user. As per another important LTE constraint, this rank must be invariant across all RBGs assigned to that user. In an embodiment, we allow only one TP to serve a scheduled user in any sub-frame, which precludes joint transmission (JT) wherein a user can receive data from more than one TP on any RBG. In addition, we also preclude frequency selective dynamic point selection (DPS)), wherein a user can receive data from different TPs on different RBGs. Our contention is that this is indeed a wise choice because for both these schemes ensuring a reliable channel estimation at the user end prior to demodulation is very challenging. This assertion holds since for both these schemes a quasi co-location indication that would allow a user to obtain reliable channel estimates by reusing some parameters that are estimated using dense cell-specific reference signals, cannot be correctly sent. Moreover, in the case of JT, the available feedback is insufficient to exploit coherent combining gains. Note then that due to the broadcast nature of the wireless channel, the signal intended for some user transmitted by some TP on an RBG, is also received as interference by all other users co-scheduled on that RBG. Thus, in order to coordinate signal transmissions, the cluster scheduler requires CSI about all relevant channel and interference covariance matrices. In an FDD system the CSI must be obtained via over-the-air feedback signaling sent from the users in the cluster. This necessitates an estimation followed by quantization and feedback procedure at each user that is described next.

A description will now be given regarding a channel state information (CSI) feedback procedure, in accordance with an embodiment of the present principles.

In networks conforming to the LTE standard, the CSI feedback procedure must be accomplished using a two step method as described below:

In a first step, a CoMP set is configured for each user in the cluster. In particular, for each user $k \in U$ a set $C_k \subseteq M$: $1 \leq |C_k| \leq 3$ is configured and referred to as the CoMP set for user k. This set is held fixed for several frames (several tens of milliseconds). This set includes the TP in the cluster from which user k receives the highest average signal power, denoted here by $\alpha_k$ and referred to as the anchor TP of user k. In addition, the CoMP set can include up to two other TPs in the cluster from whom that user receives the second and third highest average signal powers, respectively, provided those powers are greater than a (pre-set) fraction of the highest average received signal power. The main motivation of configuring such a CoMP set is that the TPs in that set represent those in the cluster from which the user can receive a signal with a relatively significant average power. Thus, on any RBG on which user k is scheduled, the scheduler must coordinate the transmissions by the TPs in $C_k$ to ensure a received signal quality close to the intended one at user k. The transmissions from the remaining TPs in the cluster can be regarded to have much lesser impact. As a result, we express the model in Equation (1) as follows:

$$y_{j,k,l} = \sum_{m \in C_k} H_{j,k,m} t_{j,m,l} + \eta_{j,k,l}, \quad (3)$$

where the vector $\eta_{j,k,l}$ captures the additive noise as well as the out of CoMP set interference. Accordingly, each user $k \in U$ sends CSI feedback only for TPs in its CoMP set $C_k$. Note here that the set of all users U can be partitioned into two parts $U = U^{non.comp} \cup U^{comp}$, such that a user k belongs to $U^{non.comp}$ ($U^{comp}$) if and only if its CoMP set size is equal to (greater than) one.

In the second step, one or more CSI-processes are configured for each user k (again once in several frames). Each CSI-process indicates a set of REs (that is periodic in both time and frequency) on which pilots from a TP in $C_k$ are sent. The periodicity in time (frequency) is decided a-priori based on the coherence time (bandwidth). In addition, that CSI-process also includes another set of REs (having the same respective time and frequency periodicities) for interference measurement. The latter REs are referred to as interference measurement resources (IMRs). We note that since these sets of indicated REs are periodic, they can each be viewed as being formed by repeating a base pattern of REs over time-frequency windows. Over each such window, the user estimates a channel matrix (using pilots) and an interference covariance matrix (using IMRs) in order to determine its CSI report (corresponding to that window of that CSI-process), which it then feeds back via over-the-air signaling.

A description will now be given regarding configuring and utilizing CSI processes, in accordance with an embodiment of the present principles.

Two exemplary ways are described of configuring and utilizing CSI-processes, the first referred to as the "Class-A" approach and the second referred to as the "Class-B" approach. The Class-A approach is also described above with respect to method 700 of FIG. 7.

A description will now be given of the Class-A approach, in accordance with an embodiment of the present principles.

For each user k, one CSI-process is configured for each TP $m \in C_k$ in its CoMP set in the following manner. Let us focus on the CSI feedback that is determined under that process over a time-frequency window. Suppose that pilots from TP m are sent on an RE l' of RBG j' within that window. Then, the received observation at user k is given by the following:

$$y_{j',k,l'} = H_{j',k,m} S_{j',m,l'} + \eta_{j',k,l'}, \quad (4)$$

where $S_{j',m,l'}$ denotes the pilot symbol sent from TP m. Note that all other TPs in the CoMP set $C_k$ are muted on that RE in order to ensure a reliable channel estimation by the user. Next, the received observation at another RE l'' in that RBG that is configured for interference measurement, is given by the following:

$$y_{j',k,l''} = \eta_{j',k,l''}, \quad (5)$$

where we note that all TPs in the CoMP set $C_k$ are muted on that RE in order to let the user measure out of CoMP set interference. From the observations in Equations (4) and (5), the user can obtain the channel and interference covariance estimates $H_{j',k,m}^{est.}$ and $\Sigma_{j',k,l''}^{est.out.}$, respectively. The user then obtains a whitened channel estimate $(\Sigma_{j',k,l''}^{est.out.})^{-1/2} H_{j',k,m}^{est.}$, quantizes it and sends the quantized estimate $Q((\Sigma_{j',k,l''}^{est.out.})^{-1/2} H_{j',k,m}^{est.})$ as its feedback. The quantized estimate is represented by a rank value which indicates the number of preferred channel directions (or modes) and identifies the quantization codebook used, as well as a precoder from that codebook whose columns indicate preferred directions, and a corresponding gain value for each such direction. This process is repeated for all time-frequency windows and for each CSI-process.

Let us now consider how all the received feedback is employed by the cluster scheduler. At the scheduler, the feedback received from all users is used to approximate the received observations in Equation (3). In particular, for each RBG j the received observations are approximated as follows:

$$y_{j,k,l} \approx \Sigma_{m \in C_k} \hat{H}_{j,k,m} t_{j,m,l} + \hat{\eta}_{j,k,l}, \quad (6)$$

$\hat{H}_{j,k,m}$, $\forall k \in U$, $m \in C_k$ are the re-constructed whitened channel estimates and $E[\hat{\eta}_{j,k,l} \hat{\eta}_{j,k,l}^\dagger] = I$. These reconstructed estimates are based on most recently received CSI reports corresponding to CSI processes configured for user k and TPs $m \in C_k$. This model is then used to an obtain an estimate of the weighted rate of each user scheduled on RBG j under any tentative scheduling decision. In order to detail the estimation of these weighted rates, we let $X_{j,k,m,r} \in \{0,1\}$ denote an indicator variable that is one if user $k \in U$ is scheduled to receive data from a TP $m \in C_k$ on an RBG $j \in N$ and assigned rank $r \in R_{k,m}$, and is zero otherwise. $R_{k,m}$ denotes the set of ranks that can be assigned to user k when it is served by TP m. We collect all such variables corresponding to an RBG j into a vector $X_{(j)} = [X_{j,k,m,r}]_{k \in U, m \in C_k, r \in R_{k,m}}$. Note that for each RBG j and any given $X_{(j)}$ we can see from the model in Equation (6) that we have a Gaussian interference channel (GIFC) where the ranks assigned to all scheduled users is given. Then, an estimate of the weighted rate that can be obtained on RBG j for each user k under any tentative scheduling decision $X_{(j)}$ (denoted here by $R(X_{(j)}, j, k, m, r)$), can for example be determined using the following relation:

$$R(X_{(j)}, j, k, m, r) = \log|I + O_k^x{}_{j,k,m,r} M_{j,k,m,r} (M_{j,k,m,r})^\dagger C_{j,k,m})^{-1}|, \; C_{j,k,m} = I + \Sigma_{k',m',r':k' \neq k} x_{j,k',m',r'} M_{j,k',m',r'} M^\dagger_{j,k',m',r'} \text{ and}$$
$$M_{j,k',m',r'} = \hat{H}_{j,k',m'} W_{j,k',m',r'}$$

$W_{j,k',m',r'}$ denotes a transmit precoder that has r' columns and satisfies the norm constraint $(W^\dagger_{j,k',m',r'} W_{j,k',m',r'}) \leq P_{m'}$. Note that any algorithm (specified a-priori) to compute these transmit precoding matrices (given the assigned ranks and the power constraints) can be employed. For instance, such an algorithm can be based on SLNR criterion, interference alignment, or can be an iterative one to optimize the weighted sum rate. $o_k$ denotes the outer-loop-link-adaptation (OLLA) factor associated with user k. These factors are essential to compensate for feedback inaccuracy and are updated based on the ACK/NACK received from that user. Thus, $\Sigma_{k \in U} \Sigma_{m \in C_k} \Sigma_{r \in R_{k,m}} R(X_{(j)}, j, k, m, r)$ denotes the estimated weighted sum rate for RBG j under $X_{(j)}$.

A description will now be given of the Class-B approach, in accordance with an embodiment of the present principles. The Class-B approach is also described above with respect to method 800 of FIG. 8.

The Class-B approach is geared towards exploiting coordinated muting, thereby simplifying the rate computation. In particular, for each user $k \in U$ one CSI-process for each TP $m \in C_k$ in its CoMP set is configured exactly as in the previous approach. In addition, for each user $k \in U^{comp}$, and each TP $m \in C_k$, a second CSI-process is configured, under which the feedback is determined over a time-frequency window that includes some RBG j' as follows. The received observations at user k on any RE l' within that RBG, on which pilots from TP m are sent are given as before by Equation (4). However, the received observation at another RE l''' in that RBG that is configured for interference measurement is now given by the following:

$$y_{j',k,l'''} = \Sigma_{m' \in C_k: m' \neq m} H_{j',k,m'} t_{j',m',l'''} + \eta_{j',k,l'''} \quad (7)$$

where we note that all TPs in the CoMP set $C_k$ (other than m) transmit on that RE in order to let the user measure total (intra CoMP set and out of CoMP set) interference. From the observations in Equations (4) and (7) the user can obtain the channel and interference covariance estimates, respectively. The user then quantizes and feeds back the whitened channel estimate and the process is repeated for all time-frequency windows.

Let us now consider how all the received feedback is employed by the cluster scheduler in this case. Here, the scheduler directly relies on the user feedback in order to obtain weighted rate estimates instead of constructing an approximate GIFC model. In particular, for each CoMP user $k \in U^{comp}$ the weighted rate estimate is obtained as $R(X_{(j)}, j, k, m, r) = x_{j,k,m,r} R^{No.Int.}(j, k, m, r)$, when no user is scheduled (as per $X_{(j)}$) on RBG j by any TP $m' \neq m$ that also lies in the CoMP set $C_k$. $R^{No.Int.}(j, k, m, r)$ is an estimate of the weighted rate that can be achieved by user k if it receives data from TP m (with rank r) on RBG j in the absence of intra-cluster interference. Notice that $R^{No.Int.}(j, k, m, r)$ is directly computed using only the feedback from the first CSI process configured for user k and TP m. On the other hand, when at-least one other TP in its CoMP set is active (i.e., is scheduled as per $X_{(j)}$ to serve some other user on RBG j) then the weighted rate estimate is obtained as $R(X_{(j)}, j, k, m, r) = x_{j,k,m,r} R^{Int.}(j, k, m, r)$, where $R^{Int.}(j, k, m, r)$ is directly computed using only the feedback from the second CSI process configured for user k and TP m. Finally, notice that only one CSI process is configured for each non-CoMP user $k \in U^{non.comp}$. Then, the weighted rate estimate for such a user is directly computed using only the feedback from its configured CSI process, which we express as $R(X_{(j)}, j, k, m, r) = x_{j,k,m,r} R^{No.Int.}(j, k, m, r)$. Further, since $|C_k| = 1$ for such a user, for convenience in exposition and with some abuse of our adopted convention, we also set $R^{Int.}(j, k, m, r) = R^{No.Int.}(j, k, m, r)$ so that $R(X_{(j)}, j, k, m, r) = x_{j,k,m,r} R^{Int.}(j, k, m, r)$ for all $k \in U^{Non.comp}$.

A description will now be given of a comparison of the two approaches, in accordance with an embodiment of the present principles.

In comparing the two approaches, it can be seen that the Class-B approach configures more CSI processes to obtain more feedback. The Class-B approach uses these CSI reports to determine weighted rate estimates for each user (under any scheduling decision) based solely on that user's feedback. This aspect avoids the estimation of such rates based on determining transmit precoding matrices using the approximate models as in the Class-A approach, thereby reducing implementation complexity. Indeed, in the Class-B approach the transmit precoder selected by a TP on any RBG, simply follows the recommendation made by the user it seeks to serve. In particular, the transmit precoder employed is either the zero matrix if no user is served, or it is (up-to scaling and column subset selection) one of the at-most two matrices recommended by the user depending on whether or not any of the other TPs in that user's CoMP set are active on that RBG. Hence, the transmit precoding in the Class-B approach can be viewed as more akin to coordinated muting. TABLE 1 shows symbol definitions for some of the symbols used herein.

TABLE 1

| SYMBOLS | SYMBOL DEFINITION |
|---|---|
| U | Set of users with cardinality $|U| = K$ |
| N | Set of N RBs |
| M | Set of M TPs |
| $U^{comp}$ | Set of CoMP users |
| $U^{non-comp}$ | Set of non CoMP users |
| $C_k$ | CoMP set of user k |
| $R_{k,m}$ | Set of ranks that can be assigned to user k when served by TP m |
| $\check{U}$ | Set of all non-CoMP users for whom only one rank can be assigned |
| $\hat{U}$ | Set of remaining users obtained as $U \setminus \check{U}$ |
| $x_{j,k,m,r}$ | Indicator variable which is 1 when RBG j is assigned to user k under TP m and rank r |
| $X_{(j)}$ | Vector containing all indicator variables pertaining to RBG j |
| $y_{k,m,r}$ | Indicator variable which is 1 when at-least one RBG is assigned to user k under TP m and rank r |
| $R(X_{(j)}, j, k, m, r)$ | Estimate of weighted rate achieved for user k on RBG j when served by TP m and rank r under assignment (j) |
| $R^{No.Int.}(j, k, m, r)$ | Direct feedback based estimate of weighted rate of user k on RBG j when served by TP m and rank r without interference |
| $R^{Int.}(j, k, m, r)$ | Direct feedback based estimate of weighted rate of user k on RBG j when served by TP m and rank r with interference |

A description will now be given regarding influencing the CSI estimation, in accordance with an embodiment of the present principles.

A description will now be given regarding influencing the CSI estimation by injecting isotropic interference, in accordance with an embodiment of the present principles.

An important aspect of influencing the CSI that is estimated by each user (according to its configured CSI processes), that applies to both the aforementioned approaches, is that of injecting interference on the IMRs. In particular, the out of CoMP set interference in Equation (5) and the total interference in Equation (7) can be controlled by the network. We consider two ways of control herein. The first one is where each interfering TP (from the measuring a user's perspective) simply transmits data on the IMRs, to the user that it is serving on that RBG. We note here that the signal transmitted by each such TP on an IMR is generated using the same precoder that is used to generate signals on all other REs in the RBG that includes that IMR. The second one is where each interfering TP transmits an isotropically distributed signal on each IMR, so that the covariance matrix of the signal transmitted on any IMR is a scaled identity matrix. In other words, each interfering TP transmits on each IMR a signal that is randomly and independently generated using an identical distribution with the desired (scaled identity) covariance and where the scaling factor is controllable.

The key advantage in the latter case is that the feedback that is sent is no longer dependent on the precoders that were being employed for data transmission by the interferers during the measurement instance.

A description will now be given regarding influencing the CSI estimation by rank restriction, in accordance with an embodiment of the present principles.

As mentioned herein, the quantized feedback reported by each user under each of its configured CSI processes includes a rank value which indicates the number of preferred channel directions (or modes) being quantized. Since the feedback load remains fixed across all ranks, the quantization error is smaller for lower ranks since a fewer number of modes need to be quantized there. A useful feature provided in the LTE standard is one where a rank restriction can be independently imposed on each CSI process. For instance, by configuring a user to use only lower rank values, the scheduler can obtain the first few dominant modes of the channel with higher accuracy albeit at the expense of not obtaining the remaining ones. Furthermore, in LTE, a CSI process configured for a user can be defined as a reference rank process for one or more of the other CSI processes configured for that user. In that case, the user will first determine a rank for obtaining the quantized feedback corresponding to the reference process, and then use the same rank for those other processes. Finally, recall that $R_{k,m}$ denotes the set of ranks that can be assigned to user user k when it is served by TP m. The formulation provided herein allows full freedom in choosing this set.

A description will now be given of a problem formulation to which the present principles can be applied, in accordance with an embodiment of the present principles.

We introduce our optimization problem in Equation (8), which seeks to maximize the weighted sum-rate system utility. Note that the first constraint in Equation (8) enforces that on each RBG, each TP can serve at most one user. The second and the third constraints together enforce that each user can be assigned only one rank and can receive data from only one TP across all the RBGs on which it is scheduled.

$$\max_{\substack{x_{j,k,m,r}, y_{k,m,r} \in \{0,1\} \\ j \in \mathcal{N}, k \in \mathcal{U}, m \in C_k, r \in R_{k,m}}} \left\{ \sum_{j \in \mathcal{N}} \sum_{k \in \mathcal{U}} \sum_{m \in C_k} \sum_{r \in R_{k,m}} R(X_{(j)}, j, k, m, r) \right\} \quad (8)$$

$$\text{s.t.} \sum_{\substack{k \in \mathcal{U}: \\ m \in C_k}} \sum_{r \in R_{k,m}} x_{j,k,m,r} \leq 1, \forall j, m;$$

$$y_{k,m,r} \geq \max_{j \in \mathcal{N}} \{x_{j,k,m,r}\}, \forall k, m, r;$$

$$\sum_{m \in C_k} \sum_{r \in R_{k,m}} y_{k,m,r} \leq 1, \forall k;$$

We note that the constraint of allowing only one rank per scheduled user is required in LTE. In summary, the formulation in Equation (8) permits coordinated precoding (that subsumes coordinated muting) and frequency non-selective DPS, which are the most promising CoMP schemes. Notice here that for any user k we can choose to impose an additional constraint $R(X_{(j)}, j, k, m, r)=0$, $\forall j$, r for each $m \in C_k$: $m \neq A_k$ and doing so will enforce that such a user can only be served by its anchor TP when it is scheduled.

The problem in Equation (8) is a discrete combinatorial optimization problem. Unfortunately, the problem even in the single TP per cluster (M=1) case is NP-hard. For general M>1, it can be shown that the problem in Equation (8) can be even hard to approximate. Then, to efficiently obtain a good sub-optimal solution, a useful observation is exploited that a related sub-problem can be approximately solved in a simple manner. Towards this end, suppose $\hat{X}_{(j)} = [\hat{x}_{j,k,m,r}]_{k \in U, m \in C_k, r \in R_{k,m}}$, $\forall j \in N$ denotes a tentative feasible scheduling decision. Our aim is to improve the tentative decision at hand and obtain another feasible decision $X_{(j)} = [x_{j,k,m,r}]_{k \in U, m \in C_k, r \in R_{k,m}}$, $\forall j \in N$. For tractability in obtaining such an improvement, the restriction is imposed that no assignment made in the decision $\hat{X}_{(j)} \forall j \in N$ can be changed and that on each RBG at-most one more assignment can be made while retaining feasibility. To summarize, the sub-problem in Equation (9) is considered.

The algorithm (also referred to herein as the "Iterative Submodular Algorithm" (ISA)) obtains a solution to Equation (8) by repeatedly solving the sub-problem in Equation (9). In particular, each outer iteration of the ISA algorithm (i.e., all the steps within the While-do loop) enhances the tentative scheduling decision, $\hat{X}_{(j)}$ $\forall$ j∈N at hand. The enhancement is done by solving the sub-problem in Equation (9) via a greedy sub-routine implemented in the inner iterations (comprising of all the steps within the Repeat-until loop). Notice here that $\Theta$ denotes the weighted sum rate achieved on RBG j for all j∈N, i.e., $\Theta_j = \Sigma_{k \in U} \Sigma_{m \in C_k} \Sigma_{r \in R_{k,m}} R(\hat{X}_{(j)}, j, k, m, r) \forall j$ Each g(j,k,m,r) denotes the weighted sum rate that can be obtained on RBG j by making an additional assignment (that of scheduling user k to receive data from TP m on RBG j with rank r), and where we set g(j,k,m,r)=0 if the additional assignment is either infeasible (given the ones already made) or is not a new assignment (i.e., such an assignment has already been made). The outer iterations are terminated once no improvement can be made or if a maximum number of iterations has been reached. We can show that the enhancement done in each outer iteration to the solution at hand has the following optimality.

Theorem 1 is as follows: At each outer-iteration, given a feasible solution $\hat{X}_{(j)} \forall j \in N$, the enhanced solution $\tilde{X}_{(j)}$, $\forall j \in N$ obtained via the greedy sub-routine is within ½ of best permissible enhancement, i.e., the weighted sum rate yielded by $\tilde{X}_{(j)}$, $\forall j \in N$ is no less than half of that yielded by the optimal solution to Equation (9).

$$\max_{\substack{\tilde{x}_{j,k,m,r}, \tilde{y}_{k,m,r} \in \{0,1\} \\ j \in N, k \in U, m \in C_k, r \in R_{k,m}}} \left\{ \sum_{j \in N} \sum_{k \in U} \sum_{m \in C_k} \sum_{r \in R_{k,m}} R(\tilde{X}_{(j)}, j, k, m, r) \right\} \quad (9)$$

$$\text{s.t.} \sum_{\substack{k \in U: \\ m \in C_k}} \sum_{r \in R_{k,m}} \tilde{x}_{j,k,m,r} \leq 1,$$

$$\forall j, m; \tilde{x}_{j,k,m,r} \geq \hat{x}_{j,k,m,r}, \forall j, k, m, r;$$

$$\sum_{k \in U} \sum_{m \in C_k} \sum_{r \in R_{k,m}} \tilde{x}_{j,k,m,r} \leq 1 + \sum_{k \in U} \sum_{m \in C_k} \sum_{r \in R_{k,m}} \hat{x}_{j,k,m,r} \forall j;$$

$$\tilde{y}_{k,m,r} \geq \max_{j \in N} \{\tilde{x}_{j,k,m,r}\}, \forall k, m, r;$$

$$\sum_{m \in C_k} \sum_{r \in R_{k,m}} \tilde{y}_{j,k,m,r} \leq 1, \forall k;$$

A description will now be given of a Coordinated Multi-Point (CoMP) scheduling algorithm, in accordance with an embodiment of the present principles. An implementation of the CoMP scheduling algorithm is also described above with respect to method 400 of FIGS. 4-6.

Proof 1 is as follows: Consider the problem in Equation (9) for a given feasible solution $\hat{X}_{(j)}$, $\forall j \in N$. Recalling the definition of g(j,k,m,r) (12) and (13) for each choice of j∈N, k∈U, m∈C_k and r∈R_{k,m}, we can re-formulate Equation (9) as Equation (10).

$$\max_{\substack{\tilde{Z}_{j,k,m,r};\, \tilde{y}_{k,m,r}\in\{0,1\} \\ j\in\mathcal{N},\, k\in\mathcal{U},\, m\in C_k,\, r\in R_{k,m}}} \sum_{j\in\mathcal{N}} \Theta_j + \left\{ \sum_{j\in\mathcal{N}} \sum_{k\in\mathcal{U}} \sum_{m\in C_k} \sum_{r\in R_{k,m}} \tilde{z}_{j,k,m,r}(g(j,k,m,r) - \Theta_j) \right\} \quad (10)$$

$$\text{s.t.} \sum_{k\in\mathcal{U}} \sum_{m\in C_k} \sum_{r\in R_{k,m}} \tilde{z}_{j,k,m,r} \leq 1, \forall j;$$

$$\tilde{y}_{k,m,r} \geq \max_{j\in\mathcal{N}} \{\tilde{z}_{j,k,m,r}\}, \forall j, k, m, r;$$

$$\sum_{m\in C_k} \sum_{r\in R_{k,m}} \tilde{y}_{k,m,r} \leq 1, \forall k$$

Next, we define the set $\check{U}=\{k\in U^{non.comp}:|R_{k,a_k}|=1\}$ that includes all non CoMP users for whom only one rank can be assigned. Then, let $\tilde{U}=U\setminus\check{U}$ denote the remaining set of users. The key observation is that each user in set U can be served by only its respective anchor TP under one rank when scheduled on any RBG. Consequently, we can first determine the best possible assignment involving only such users for each RBG j. After that we can consider the remaining users to obtain further improvements. Put differently, defining $\hat{\Theta}_j=\max\{\Theta_j, \max_{k\in\check{U},m\in C_k,r\in R_{k,m}}\{g(j,k,m,r)\}\}$ we can obtain an equivalent version of Equation (10) given by Equation (11).

decoupled manner across the RBGs), we can apply the greedy method on a relatively smaller part of the original problem in Equation (10), thereby reducing the impact of its sub-optimality. Thus, while both approaches provide an identical worst-case guarantee of ½, we observed that the method detailed here yields a better average case performance.

The following table shows exemplary pseudocode for an implementation of a standards compliant CoMP scheduling algorithm for heterogeneous wireless networks, in accordance with an embodiment of the present principles.

$$\max_{\substack{\tilde{Z}_{j,k,m,r};\, \tilde{y}_{k,m,r}\in\{0,1\} \\ j\in\mathcal{N},\, k\in\tilde{\mathcal{U}},\, m\in C_k, r\in R_{k,m}}} \sum_{j\in\mathcal{N}} \hat{\Theta}_j + \left\{ \sum_{j\in\mathcal{N}} \sum_{k\in\tilde{\mathcal{U}}} \sum_{m\in C_k} \sum_{r\in R_{k,m}} \tilde{z}_{j,k,m,r}(g(j,k,m,r) - \hat{\Theta}_j) \right\} \quad (11)$$

$$\text{s.t.} \sum_{k\in\tilde{\mathcal{U}}} \sum_{m\in C_k} \sum_{r\in R_{k,m}} \tilde{z}_{j,k,m,r} \leq 1, \forall j;$$

$$\tilde{y}_{k,m,r} \geq \max_{j\in\mathcal{N}} \{\tilde{z}_{j,k,m,r}\}, \forall, k, m, r;$$

$$\sum_{m\in C_k} \sum_{r\in R_{k,m}} \tilde{y}_{k,m,r} \leq 1, \forall k$$

Note that in the optimization problem in Equation (11), we can regard the pair (m,r,) as one format so that the second and third constraints enforce that each scheduled user must be assigned one format. Further, without loss of optimality, we can set $\tilde{z}_{j,k,m,r}=0$ for each j, k, m, r: $g(j, k, m, r) < \hat{\Theta}_j$. Then, the resulting problem is in-fact equivalent to a single-cell downlink scheduling problem in which at-most one user can be scheduled on each sub-carrier (the first constraint in Equation (11)) and that each scheduled user must be assigned one format across all its assigned subcarriers. We can then deduce that Equation (11) is equivalent to the maximization of a normalized non-negative non-decreasing submodular set-function over a partition matroid and thus can be solved to within ½ optimality by a greedy algorithm. The greedy sub-routine of the ISA is indeed that greedy algorithm. Consequently, we can assert that the theorem is true.

It is to be noted that an alternate design of ISA would be to use the greedy method directly on the problem in Equation (10). Compared to that, our design implements the greedy method after a hot start on the one in Equation (11) instead. The intuition is that since the best possible assignments over users in $\check{U}$ can be readily determined (in a

---

Algorithm 1: Interactive Submodular Algorithm (ISA)

(1) Initialize $\Theta_j = 0$, $\forall j$, $\{\hat{x}_{j,k,m,r} = 0\}$ $\forall j, k, m, r$, (12)
    Outer = false and Iter = 1
(2) While (Outer = False) and (Iter ≤ IterMax)Do
(3) For each $j \in \mathcal{N}$, $k \in \mathcal{U}$, $m \in C_k, r \in R_{k,m}$, Do
(4) If $\max_{k',r'}\{\hat{x}_{j,k',m,r'}\} > 0$ or $\max_{m',r'}\{\hat{x}_{j,k,m',r'}\} > 0$
    or $\max_{m':j':j'\neq j,r'=r}\{\hat{x}_{j',k,m',r'}\} > 0$ or
    $\max_{m':m'=m,j':j'\neq j,r'}\{\hat{x}_{j',k,m',r'}\} > 0$ Then set
    $g(j, k, m, r) = 0$.
(5) Else update $\hat{x}_{j,k,m,r}=1$ to compute $g(j, k, m, r)$ as (13)

$$\sum_{k'\in\mathcal{U}} \sum_{m'\in C_k} \sum_{r'\in R_{k',m'}} R(\hat{X}_{(j)}, j, k', m', r')$$

(6) EndIf
(7) EndFor
(8) Set $\tilde{z}_{j,k,m,r} = 0$, $\forall j, k, m, r$, Outer = true and Inner = false.
(9) Repeat
(10) For each $j \in \mathcal{N}$, Do
(11) Determine $$(k^*, m^*, r^*) = \arg \max_{k\in\tilde{\mathcal{U}},m\in C_k,r\in R_{k,m}} \{g(j, k, m, r)\}$$

(12) If $g(j, k, m, r) > \Theta_j$ Then
(13) Set $\tilde{z}_{j,k^*,m^*,r^*} = 1$, Outer = false and $\Theta_j = g(j, k^*, m^*, r^*)$ Algorithm 1: Interactive Submodular Algorithm (ISA)

(14) EndIf
(15) EndFor
(16) For each $k \in \tilde{\mathcal{U}}$, $m \in C_k$, $r \in R_{k,m}$, Do
(17) Determine $h(k, m, r) = \sum_j \max\{0, g(j, k, m, r) - \Theta_j\}$
(18) EndFor
(19) Determine
$$(k^*, m^*, r^*) = \underset{k,m,r}{\operatorname{argmax}}\{h(k, m, r)\} \quad (14)$$
(20) If $h(k^*, m^*, r^*) > 0$ then
(21) Set Outer = false
(22) For each $j \in \mathcal{N}$
(23) If $g(j, k^*, m^*, r^*) > \Theta_j$ then
(24) Set $\tilde{z}_{j,k^*,m^*,r^*} = 1$, $\Theta_j = g(j, k^*, m^*, r^*)$ and $\tilde{z}_{j,k',m',r'} = \forall (k', m', r') \neq (k^*, m^*, r^*)$
(25) EndIf
(26) Endfor
(27) Else set Inner = true
(28) EndIf
(29) Until Inner = true
(30) Update $\hat{X}_{(j)}$, $\forall j$ by accepting assignments made in $\{\tilde{z}_{j,k,m,r}\}$
(31) EndWhile
(32) Output $\hat{X}_{(j)}$, $\forall j$ $$\sum_{m \in M}^{max} k \in \mathcal{U}^{non.comp}: \quad (15)$$

$$\hat{m}_k = m\bigg\{R^{Int.}(j, k, m, \hat{r}_k) > \sum_{k \in \mathcal{U}} \sum_{m \in C_k} \sum_{r \in R_{k,m}} R(\hat{X}_{(j)}, j, k, m, r)\bigg\}$$

Notice that in Equation (15) we have used the fact that even in the Class-A approach we can express $R(X_{(j)}, j,k, m, r) = x_{j,k,m,r} R^{Int.}(j, k, m, r) \forall k \in U^{non.comp}$ given that only non CoMP users are scheduled on RBG j under any tentative decision $X_{(j)}$. On the other hand, for the Class-B approach we check the condition in Equation (15) but after replacing $U^{non.comp}$ with U. Then, if the respective conditions are satisfied, we accordingly change the decision $\hat{X}_{(j)}$. Note also that this simple update can be done separately for each RBG and improves the system utility while preserving feasibility.

A description will now be given of benchmarking, in accordance with an embodiment of the present principles.

Over simple networks, we can benchmark the ISA against an upper bound obtained via a brute-force search after ignoring the constraints of assigning each scheduled user one rank and/or one serving TP. Moreover, in the scenario where the Class-B approach is adopted, we can re-formulate Equation (8) as the integer linear program (ILP) in Equation (16).

$$\underset{\substack{\mathcal{U}_{j,k,m,r}, v_{j,k,m,r}, y_{k,m,r}, z_{j,m} \in \{0,1\} \\ j \in \mathcal{N}, k \in \mathcal{U}, m \in C_k, r \in R_{k,m}}}{max} \bigg\{\sum_{j \in \mathcal{N}} \sum_{k \in \mathcal{U}} \sum_{m \in C_k} \sum_{r \in R_{k,m}} (\mathcal{U}_{j,k,m,r} R^{No.Int.}(j, k, m, r) + v_{j,k,m,r} R^{Int.}(j, k, m, r))\bigg\} \quad (16)$$

$$\text{s.t. } z_{j,m} \geq \sum_{\substack{k \in \mathcal{U} \\ m \in C_k}} \sum_{r \in R_{k,m}} (\mathcal{U}_{j,k,m,r} + v_{j,k,m,r}), \forall j, m;$$

$$\max_{r \in R_{k,m}}\{\mathcal{U}_{j,k,m,r}\} + \max_{m' \in C_k: m' \neq m}\{\mathcal{Z}_{j,m'}\} \leq 1, \forall j, k, m;$$

$$y_{k,m,r} \geq \max_{j \in \mathcal{N}}\{\mathcal{U}_{j,k,m,r} + v_{j,k,m,r}\}, \forall k, m, r;$$

$$\sum_{m \in C_k} \sum_{r \in R_{k,m}} y_{k,m,r} \leq 1, \forall k;$$

A description will now be given of post-processing, in accordance with an embodiment of the present principles.

One drawback of the ISA due to its successive nature is that it can get stuck on poor local optimal on one or more RBGs, which makes post-processing essential. We adopt a simple post-processing stage. For each user k that is scheduled (i.e., assigned at-least one RBG) by the ISA we let $(\hat{r}_k, \hat{m}_k)$ denote the assigned rank and serving TP. Notice that for each scheduled user there will be only one assigned rank and serving TP and moreover, for each scheduled non-CoMP user (i.e., each scheduled user lying in $U^{non.comp}$) the assigned serving TP will necessarily be its anchor TP. For all other users (i.e., those not assigned any RBG), let us fix $\hat{m}_k = \alpha_k$, where we recall that $\alpha_k$ denotes the anchor TP of user k and set $\hat{r}_k = 1$ (or some default choice such as a rank reported by user k for its anchor $\alpha_k$). Then, considering the Class-A approach, on each RBG j we check if scheduling the best set of non-CoMP users would yield a higher weighted sum rate, i.e., if the following applies:

Upon relaxing the binary value constraints in (16), we obtain an LP. The latter LP can be optimally solved to obtain an upper-bound to (16) and benchmark the solution yielded by the ISA for this case.

A description will now be given of user pre-selection, in accordance with an embodiment of the present principles.

In a practical HetNet, the number of active users in a cluster can be quite large. In such scenarios, the control channel constraints may limit the number of users that can be served. In particular, the feedforward signaling (including the scheduling grant) to each scheduled user is sent from its anchor TP, over the control channel that has a limited capacity. It thus makes sense from a complexity stand-point to pre-select a pool of good users in a simple manner and then use the ISA on the selected pool of users. In an embodiment, one such user pre-selection method is proposed which assumes that the Class-B approach is adopted. We consider the problem in Equation (17) (which assumes that all TPs are active on all RBGs) where J is a specified user limit for each TP. $M_k$ is the set of TPs that can serve user $k \in U$ and we set $M_k = C_k \forall k$.

$$\max_{\substack{v_{j,k,m,r},\ y_{k,m,r} \in \{0,1\} \\ j \in N,\ k \in \mathcal{U},\ m \in M_k,\ r \in R_{k,m}}} \left\{ \sum_{j \in N} \sum_{k \in \mathcal{U}} \sum_{m \in M_k} \sum_{r \in R_{k,m}} (v_{j,k,m,r} R^{Int.}(j,k,m,r)) \right\} \quad (17)$$

$$s.t.\ \mathcal{Y}_{k,m,r} \geq \max_{j \in N} \{v_{j,k,m,r}\},\ \forall\ k, m, r;$$

$$\sum_{m \in M_k} \sum_{r \in R_{k,m}} \mathcal{Y}_{k,m,r} \leq 1,\ \forall\ k;$$

$$\sum_{k \in \mathcal{U}: \alpha_k = m'} \sum_{m \in M_k} \sum_{r \in R_{k,m}} \mathcal{Y}_{k,m,r} \leq J,\ \forall\ m' \in M;$$

Proposition 1 is as follows: The problem in Equation (17) is equivalent to the problem of maximizing a normalized non-negative non-decreasing submodular set function subject to one matroid constraint.

We also consider a reference second method where we set $M_k = \{\alpha_k\} \forall k$, upon which Equation (17) reduces to a problem for which Proposition 1 readily holds. Consequently, the classical greedy algorithm is used on the equivalent reformulations (which in either case offers a ½ approximation) to obtain the respective pre-selection algorithms. From the output of the pre-selection algorithm, the set of users that have each been assigned at-least one RBG is retrieved and used (instead of U) as the input user set to the ISA (the RBG or rank or serving TP assignments made by the pre-selection algorithm are ignored). Notice that to further reduce the complexity of pre-selection, we can appropriately restrict each set $R_{k,m}$ to be a singleton set.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for coordinated multi-point transmission scheduling by a transmitting device over one or more heterogeneous wireless networks that include a set of clusters, each of the clusters having a set of transmission points for serving a set of user equipment devices, the method comprising:
determining constraints imposed on any of the user equipment devices, the constraints including per-user rank constraints, per-user serving Transmission Point (TP) constraints, control channel overhead constraints, power constraints, Long Term Evolution (LTE) constraints, matroid constraints, binary value constraints, and coupling constraints;
receiving channel state information feedback from the user equipment devices;
obtaining weighted rates for one or more users and buffer sizes; and
iteratively determining a weighted sum of user rates based on the constraints, the channel state information feedback, the weighted rates for one or more users, and the buffer sizes,
wherein said iteratively determining step determines the weighted sum of user rates based on an initial weighted sum of user rates determined for the user equipment devices without the constraints.

2. The method of claim 1, wherein said iteratively determining step refines the weighted sum of user rates based on weighted sums of user rates determined for the user equipment devices with the constraints.

3. The method of claim 1, wherein the heterogeneous wireless networks are Long-Term Evolution heterogeneous wireless networks.

4. The method of claim 3, further comprising:
imposing the per-user rank constraint as a first constraint that restricts a scheduled one of the user equipment devices to be assigned only one rank value, the rank value representing a number of data stream assigned to that scheduled one of the user equipment devices; and imposing the per-user serving Transmission Point constraint as a second constraint that restricts the scheduled one of the user equipment devices to receive data from only one of the transmission points.

5. The method of claim 1, wherein the channel state information feedback for a given one of the plurality of user equipment devices is determined by (i) configuring a channel state information process under which pilots are sent using a set of resource elements by one or more transmission points in a group of transmissions points assigned to the given one of the user equipment devices from the set of transmission points, and (ii) estimating interference from transmissions points outside of the group of transmission points.

6. The method of claim 1, further comprising, for each of the plurality of user equipment devices by the base station:

configuring a coordinated multi-point transmission set that specifies for a given one of the user equipment devices in the given cluster, any of the transmission points in the given cluster from which the given one of the user equipment devices can receive a signal with an average power above an average power threshold; and configuring a channel state information process for the given one of the user equipment devices, wherein channel state information is provided for only the transmission points specified in the coordinated multi-point transmission set.

7. The method of claim 6, wherein the channel state information process indicates a set of resource elements on which pilots from a given one of the transmission points specified in the coordinated multi-point transmission set are sent.

8. The method of claim 7, wherein the channel state information process further indicates another set of resource elements for interference measurement from the transmission points omitted from the coordinated multi-point transmission set.

9. The method of claim 1, further comprising receiving, from a given one of the plurality of user equipment devices, a channel state information process report based on a channel matrix and an interference covariance matrix.

10. The method of claim 1, further comprising performing a user pre-selection process that imposes a control channel overhead constraint on one or more of the transmission points, the control channel overhead constraint specifying a maximum number of user equipment devices to which the one or more of the transmission points send control signal information.

11. The method of claim 1, further comprising performing a user pre-selection process that imposes a limit on a number resource block groups that can be assigned to a grouping of user equipment devices from among the plurality of user equipment devices.

12. The method of claim 1, further comprising transmitting a set of signals to at least one of the user equipment devices based on the weighted sum of user rates.

13. A computer program product for coordinated multi-point transmission scheduling by a transmitting device over one or more heterogeneous wireless networks that include a set of clusters, each of the clusters having a set of transmission points for serving a set of user equipment devices, the computer program product comprising a non-transitory computer readable storage medium having program instructions embodied therewith, the program instructions executable by a computer to cause the computer to perform a method comprising:

determining constraints imposed on any of the user equipment devices, the constraints including per-user rank constraints, per-user serving Transmission Point (TP) constraints, control channel overhead constraints, power constraints, Long Term Evolution (LTE) constraints, matroid constraints, binary value constraints, and coupling constraints;

receiving channel state information feedback from the user equipment devices;

obtaining weighted rates for one or more users and buffer sizes; and iteratively determining a weighted sum of user rates based on the constraints, the channel state information feedback, the weighted rates for one or more users, and the buffer sizes, wherein said iteratively determining step determines the weighted sum of user rates based on an initial weighted sum of user rates determined for the user equipment devices without the constraints.

14. The computer program product of claim 13, further comprising, for each of the plurality of user equipment devices by the base station:

configuring a coordinated multi-point transmission set that specifies for a given one of the user equipment devices in the given cluster, any of the transmission points in the given cluster from which the given one of the user equipment devices can receive a signal with an average power above an average power threshold; and configuring a channel state information process for the given one of the user equipment devices, wherein channel state information is provided from only the transmission points specified in the coordinated multi-point transmission set.

15. The computer program product of claim 14, wherein the channel state information process indicates a set of resource elements on which pilots from a given one of the transmission points specified in the coordinated multi-point transmission set are sent.

16. The computer program product of claim 15, wherein the channel state information process further indicates another set of resource elements for interference measurement from the transmission points omitted from the coordinated multi-point transmission set.

17. The computer program product of claim 13, further comprising transmitting a set of signals to at least one of the user equipment devices based on the weighted sum of user rates.

18. A transmitting device for coordinated multi-point transmission scheduling over one or more heterogeneous wireless networks that include a set of clusters, each of the clusters having a set of transmission points for serving a set of user equipment devices, the transmitting device comprising:

a processor configured to:

determine constraints imposed on any of the user equipment devices, the constraints including per-user rank constraints, per-user serving Transmission Point (TP) constraints, control channel overhead constraints, power constraints, Long Term Evolution (LTE) constraints, matroid constraints, binary value constraints, and coupling constraints;

receive channel state information feedback from the user equipment devices;

obtain weighted rates for one or more users and buffer sizes; and iteratively determine a weighted sum of user rates based on the constraints, the channel state information feedback, the weighted rates for one or more users, and the buffer sizes, wherein the weighted sum of user rates is based on an initial weighted sum of user rates determined for the user equipment devices without the constraints.

19. The transmitting device of claim 18, further comprising a transmitter for transmitting a set of signals to at least one of the user equipment devices based on the weighted sum of user rates.

20. The transmitting device of claim 18, further comprising performing a user pre-selection process that at least one of (i) imposes a limit on a number resource block groups that can be assigned to a grouping of user equipment devices from among the plurality of user equipment devices, and (ii) imposes a control channel overhead constraint on one or more of the transmission points, the control channel overhead constraint specifying a maximum number of user equipment devices to which the one or more of the transmission points send control signal information.

* * * * *